US007046618B2

(12) United States Patent
Santhoff et al.

(10) Patent No.: US 7,046,618 B2
(45) Date of Patent: May 16, 2006

(54) BRIDGED ULTRA-WIDEBAND COMMUNICATION METHOD AND APPARATUS

(75) Inventors: John Santhoff, San Diego, CA (US); Steven A. Moore, Escondido, CA (US); Roger Rauvola, San Diego, CA (US); Charles Krinke, Irvine, CA (US); Bruce Watkins, San Marcos, CA (US)

(73) Assignee: Pulse-LINK, Inc., Carlsbad, CA (US)

( * ) Notice: Subject to any disclaimer, the term of this patent is extended or adjusted under 35 U.S.C. 154(b) by 127 days.

(21) Appl. No.: 10/723,562

(22) Filed: Nov. 25, 2003

(65) Prior Publication Data

US 2005/0111346 A1 May 26, 2005

(51) Int. Cl.
*H04J 9/00* (2006.01)
*H04L 27/20* (2006.01)

(52) U.S. Cl. .................................. 370/205; 375/295

(58) Field of Classification Search .................. None
See application file for complete search history.

(56) References Cited

U.S. PATENT DOCUMENTS

| | | | | |
|---|---|---|---|---|
| 3,631,497 A | * | 12/1971 | Leonard | 370/281 |
| 3,678,204 A | | 7/1972 | Harmuth | |
| 3,728,632 A | | 4/1973 | Ross | |
| 4,308,505 A | * | 12/1981 | Messerschmitt | 331/25 |
| 4,412,337 A | * | 10/1983 | Bickley et al. | 375/297 |
| 4,447,747 A | | 5/1984 | LaPotin | |
| 4,613,827 A | * | 9/1986 | Takamori et al. | 331/20 |
| 4,641,317 A | | 2/1987 | Fullerton | |
| 4,782,324 A | | 11/1988 | Underwood | |
| 4,979,186 A | | 12/1990 | Fullerton | |
| 5,115,409 A | | 5/1992 | Stepp | |
| 5,146,616 A | | 9/1992 | Tang et al. | |
| 5,157,559 A | | 10/1992 | Gleason et al. | |
| 5,210,748 A | * | 5/1993 | Onishi et al. | 370/405 |
| 5,363,108 A | | 11/1994 | Fullerton | |
| 5,446,384 A | * | 8/1995 | Dumoulin | 324/307 |
| 5,515,014 A | | 5/1996 | Troutman | |
| 5,574,755 A | | 11/1996 | Persico | |
| 5,587,687 A | | 12/1996 | Adams | |
| 5,635,863 A | | 6/1997 | Price, Jr. | |

(Continued)

FOREIGN PATENT DOCUMENTS

WO    WO 01/93434 A2    12/2001

OTHER PUBLICATIONS

Newton, Harry, Newton's Telecom Dictionary, CMP Books, 20th ed., Mar. 2004, p. 698*

(Continued)

*Primary Examiner*—Huy D. Vu
*Assistant Examiner*—Cynthia L. Davis
(74) *Attorney, Agent, or Firm*—Pulse-LINK, Inc.

(57) ABSTRACT

Systems, apparatus and methods are provided for bridging data to and from different communication physical layers and protocols. The present invention comprises a communication system structured to "bridge" between conventional, narrowband carrier wave communication technology and ultra-wideband communication technology. The present invention may be used in wireless and wire communication networks such as hybrid fiber-coax networks. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

2 Claims, 32 Drawing Sheets

U.S. PATENT DOCUMENTS

| | | | |
|---|---|---|---|
| 5,677,927 | A | 10/1997 | Fullerton et al. |
| 5,687,169 | A | 11/1997 | Fullerton |
| 5,687,200 | A | 11/1997 | Berger |
| 5,708,377 | A | 1/1998 | Bradley |
| 5,714,954 | A | 2/1998 | Chung et al. |
| 5,768,700 | A | 6/1998 | Kardontchik |
| 5,793,413 | A | 8/1998 | Hylton et al. |
| 5,847,623 | A | 12/1998 | Hadjichristos |
| 5,872,446 | A | 2/1999 | Cranford, Jr. et al. |
| 5,900,747 | A | 5/1999 | Brauns |
| 5,986,501 | A | 11/1999 | Rafati et al. |
| 6,026,125 | A | 2/2000 | Larrick, Jr. et al. |
| 6,031,862 | A | 2/2000 | Fullerton et al. |
| 6,043,943 | A | 3/2000 | Rezzi et al. |
| 6,054,889 | A | 4/2000 | Kobayashi |
| 6,061,551 | A | 5/2000 | Sorrells et al. |
| 6,078,277 | A | 6/2000 | Cheng et al. |
| 6,087,871 | A | 7/2000 | Kardo-Syssoev et al. |
| 6,118,339 | A | 9/2000 | Gentzler et al. |
| 6,178,217 | B1 | 1/2001 | Defries et al. |
| 6,281,822 | B1 | 8/2001 | Park |
| 6,351,652 | B1 | 2/2002 | Finn et al. |
| 6,356,224 | B1 | 3/2002 | Wohlfarth |
| 6,433,720 | B1 | 8/2002 | Libove et al. |
| 6,539,213 | B1 | 3/2003 | Richards et al. |
| 6,580,902 | B1 | 6/2003 | Sorrells et al. |
| 6,686,879 | B1 * | 2/2004 | Shattil ..................... 342/367 |
| 2001/0019313 | A1 | 9/2001 | Takahashi et al. |
| 2002/0059642 | A1 | 5/2002 | Russ et al. |
| 2003/0048212 | A1 | 3/2003 | Libove et al. |
| 2003/0081630 | A1 | 5/2003 | Mowery et al. |
| 2003/0161382 | A1 | 8/2003 | Hershey et al. |
| 2004/0114670 | A1 | 6/2004 | Cranford et al. |

OTHER PUBLICATIONS

5. Noam Geri, Hybrid Coax-Wireless Multimedia Home Networks Using 802.11 Technology, Texas Instruments, White Paper, Mar. 2003, 7 pages.

Fernando Ramirez-Mireles, "On Performance of Ultra Wideband Signals in Gaussian Noise and Dense Multipath," Paper 99C265, Accepted for Publication in the IEEE Transactions on Vehicular Technology, pp. 1-9.

Fernando Ramirez-Mireles et al., "N-Orthogonal Time-Shift—Modulated Codes for Impulse Radio," Communication Sciences Institute, Department of Electrical Engineering-Systems, University of Southern California, Los Angeles, CA 90089-2565 USA, pp. 1-4.

Henning F. Harmuth, "Frequency-Sharing and Spread-Spectrum Transmission with Large Relative Bandwidth," IEEE Transactions on Electromagnetic Compatibility, vol. EMC-20, No. 1, Feb. 1978, pp. 232-239.

Henning F. Harmuth, "Applications of Walsh functions in communications," IEEE Spectrum, Nov. 1969, pp. 82-91.

Aether Wire & Location, INC., Robert Fleming et al., "Integrated, Low-Power, Ultra-Wideband Tranceivers for Distributed Position Location and Communication," Technical Abstracts of Proposal to Defense Advanced Research Projects Agency (DARPA), Part I—Technical Proposal, 1998, pp. 1-52.

Aether Wire & Location, INC., Robert Fleming et al., "Low-Power, Miniature, Distributed Position Location and Communication Devices Using Ultra-Wideband, Nonsinusoidal Communication Technology," Semi-Annual Technical Report Prepared for : ARPA/FBI, Jul. 1995, pp. 1-40.

Henning F. Harmuth, "Fundamental Limits for Radio Signals with Large Bandwidth", IEEE Transactions on Electromagnetic Compatibility, Feb. 1981, vol. EMC-23, No. 1, pp. 37-43.

* cited by examiner

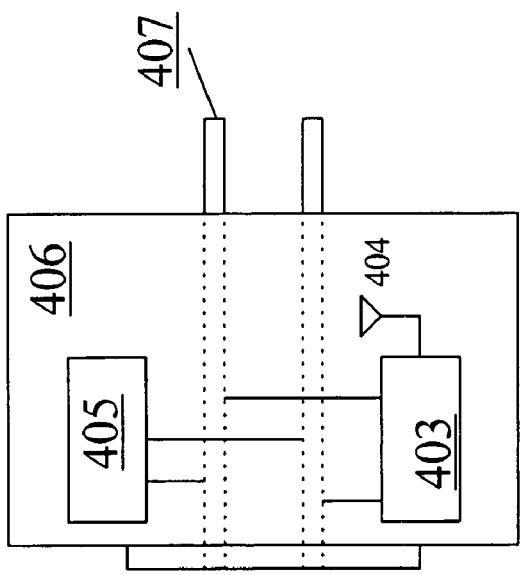
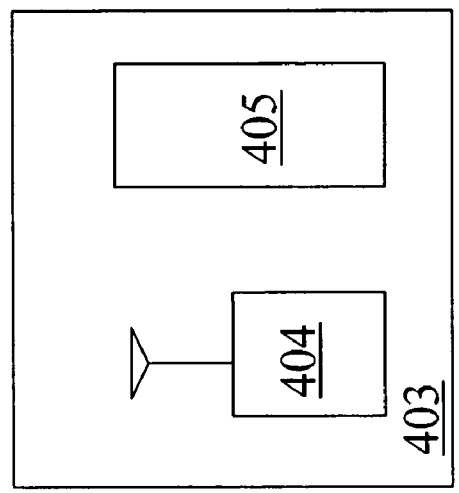
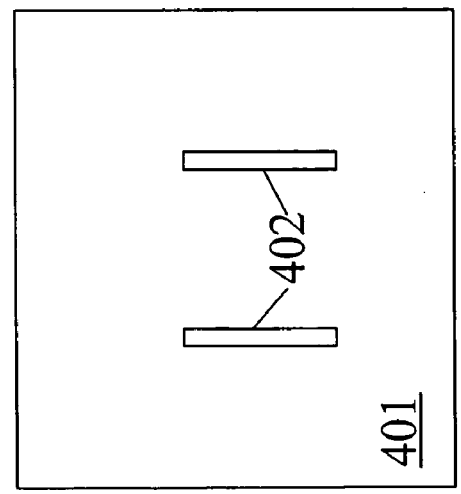
FIG. 31

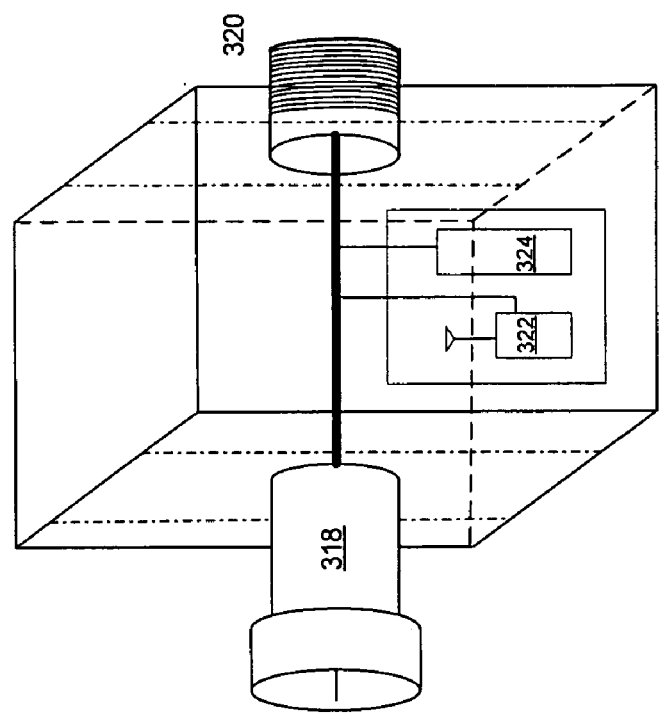
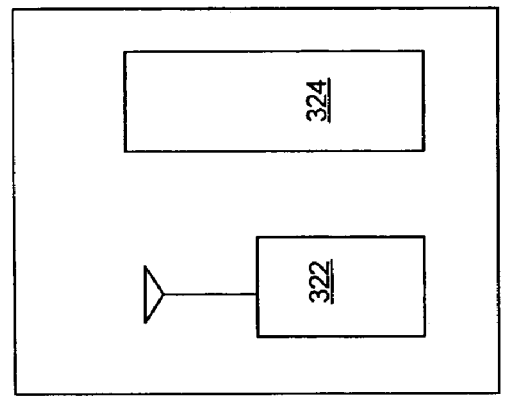
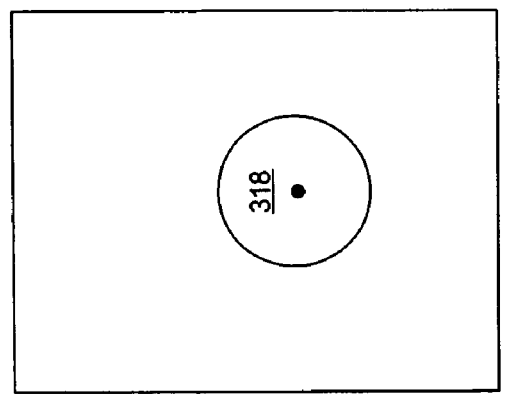
FIG. 32

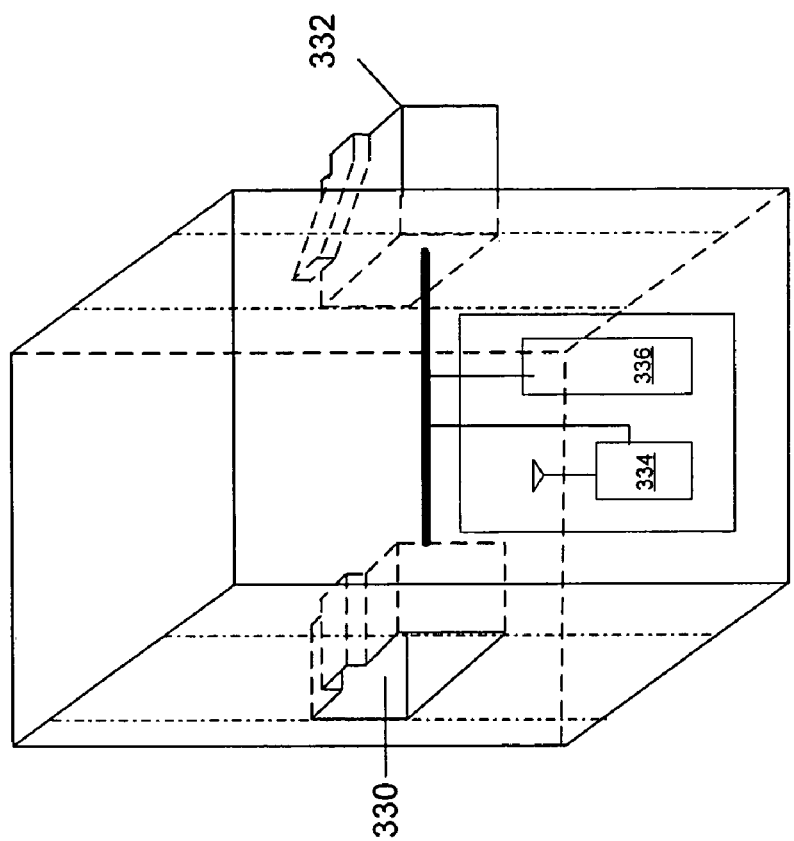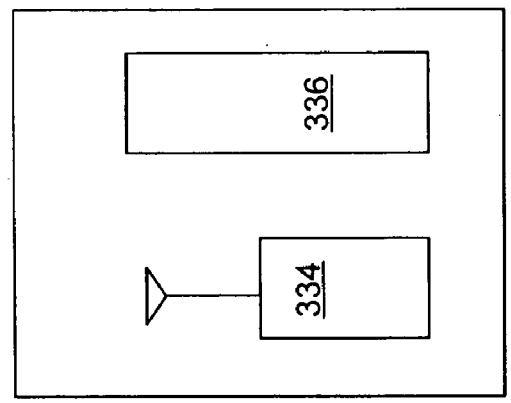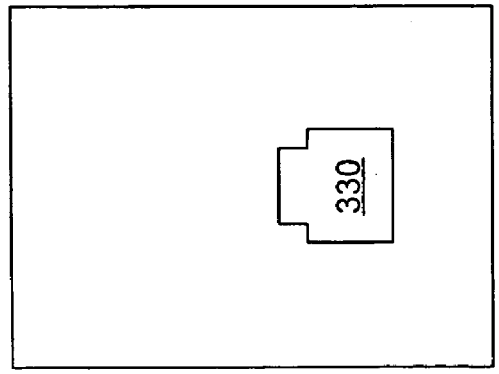
FIG. 33

BRIDGED ULTRA-WIDEBAND COMMUNICATION METHOD AND APPARATUS

FIELD OF THE INVENTION

The present invention generally relates to the field of communications. More particularly, the present invention concerns methods and apparatus for communication between different communication media and architectures.

BACKGROUND OF THE INVENTION

The Information Age is upon us. Access to vast quantities of information through a variety of different communication systems are changing the way people work, entertain themselves, and communicate with each other. Faster, more capable communication technologies are constantly being developed. For the manufacturers and designers of these new technologies, achieving "interoperability" is becoming an increasingly difficult challenge.

Interoperability is the ability for one device to communicate with another device, or to communicate with another network, through which other communication devices may be contacted. However, with the explosion of different communication protocols (i.e., the rules communications equipment use to transfer data), designing true interoperability is not a trivial pursuit.

For example, most wireless communication devices employ conventional, narrowband "carrier wave" technology that employs a specific radio frequency band, while other devices use electro-optical technology. In addition to wireless communications, data is also transmitted through wire media, such as fiber optic cable, co-axial cable, twisted-pair wire and other types of wire media. Generally, each one of these communication technologies employ their own rules, or protocols for transferring data.

Another type of communication technology is ultra-wideband (UWB). UWB technology is fundamentally different from conventional, narrowband radio frequency technology. UWB employs a "carrier free" architecture, which does not require the use of high frequency carrier generation hardware, carrier modulation hardware, frequency and phase discrimination hardware or other devices employed in conventional frequency domain communication systems. Of course, UWB has its own set of communication protocols.

Therefore, there exists a need for apparatus and methods that enable communication between different communication media, technologies, and architectures.

SUMMARY OF THE INVENTION

The present invention provides a system, methods, and apparatus that can communicate between, or "bridge" between different communications technologies. In one embodiment of the present invention, a conventional narrowband radio frequency receiver receives data. The data is then demodulated and retransmitted using ultra-wideband (UWB) communication technology. The communication may be through either wireless or wire media.

In another embodiment of the present invention, an UWB receiver receives data through a first transmission medium. The data is then demodulated and retransmitted across a second transmission medium using UWB communication technology. The first and second transmission media may be wireless or wire.

In a still further embodiment of the present invention, an UWB receiver receives data from a first transmission medium. The data is then demodulated and retransmitted by a conventional narrowband radio frequency transmitter. The communication may be through either wireless or wire media.

One feature of the present invention is that it enables communication between different communication technologies, media and architectures.

The foregoing and other features and advantages of the present invention will be appreciated from review of the following detailed description of the invention, along with the accompanying figures in which like reference numerals refer to like parts throughout.

BRIEF DESCRIPTION OF THE DRAWING

FIG. 31 is an illustration of a front view, and schematic views of a power supply transceiver constructed according to one embodiment of the present invention;

FIG. 32 is an illustration of a front view, a perspective schematic phantom view, and a functional block illustration of a coaxial cable transceiver constructed according to one embodiment of the present invention; and FIG. 33 is an illustration of a front view, a perspective schematic phantom view, and a functional block illustration of a phone line or Category 5 Ethernet transceiver constructed according to one embodiment of the present invention.

Figure 1:
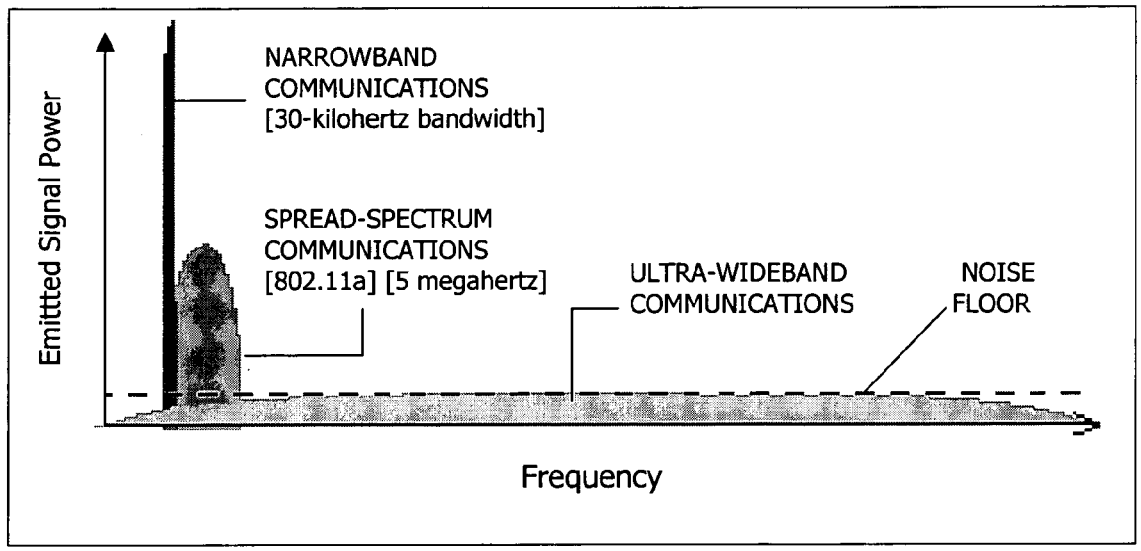
FIG. 1 is an illustration of different communication methods.

It will be recognized that some or all of the figures are schematic representations for purposes of illustration and do not necessarily depict the actual relative sizes or locations of the elements shown. The figures are provided for the purpose of illustrating one or more embodiments of the invention with the explicit understanding that they will not be used to limit the scope or the meaning of the claims.

DETAILED DESCRIPTION OF THE INVENTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The present invention provides a system, methods, and apparatus that can communicate between, or "bridge" between different communications technologies. For example, a television viewer in a residence may request a movie from a DVD player, that is in another room of the residence. The request may travel from the TV set-top-box to an ultra-wideband (UWB) enabled home gateway, that generates a UWB datastream, which is transmitted on the home's power line. The gateway may send a request to the DVD player through the power line. The DVD player may then send the video stream to the gateway via a UWB datastream modulated on a S-Video interface. The home gateway may then route the return DVD data via a UWB wireless link back to the TV's set-top-box. All these routing decisions are intelligently made and executed without user intervention.

One feature of the present invention is that it intelligently bridges UWB communications to and from all interfaced media. For example, the coaxial cable interfaced to the home gateway may have a UWB datastream coexisting with other frequency modulated data. The present invention detects and extracts the encoded UWB data from the coax cable, then determines the destination and optimal routing of the data. For example, the data enters the home on coax, but may routed from the home gateway via a UWB wireless link. Alternatively, it may routed from the home gateway on twisted pair or through the home's electrical power lines.

One aspect of the present invention is that it employs ultra-wideband (UWB) technology. One form of UWB communication is "carrier free," which does not require the use of high frequency carrier generation hardware, carrier modulation hardware, stabilizers, frequency and phase discrimination hardware or other devices employed in conventional frequency domain communication systems. That is, conventional radio frequency technology, sometimes referred to herein as "narrowband," or "narrowband radio frequency communication," employs continuous sine waves that are transmitted with data embedded in the modulation of the sine waves' amplitude or frequency. For example, a conventional cellular phone must operate at a particular frequency band of a particular width in the total frequency spectrum. Specifically, in the United States, the Federal Communications Commission has allocated cellular phone communications in the 800 to 900 MHz band. Cellular phone operators use 25 MHz of the allocated band to transmit cellular phone signals, and another 25 MHz of the allocated band to receive cellular phone signals.

Referring to FIG. 1, another example of a conventional radio frequency technology is illustrated. 802.11a, a wireless local area network (LAN) protocol, transmits continuous sinusoidal radio frequency signals at a 5 GHz center frequency, with a radio frequency spread of about 5 MHz.

In contrast, ultra-wideband (UWB) communication technology employs discrete pulses of electromagnetic energy that are emitted at, for example, nanosecond or picosecond intervals (generally tens of picoseconds to a few nanoseconds in duration). For this reason, ultra-wideband is often called "impulse radio." That is, the UWB pulses are transmitted without modulation onto a sine wave carrier frequency, in contrast with conventional, narrowband radio frequency technology as described above. A UWB pulse is a single electromagnetic burst of energy. A UWB pulse can be either a single positive burst of electromagnetic energy, or a single negative burst of electromagnetic energy, or a single burst of electromagnetic energy with a predefined phase. Alternate implementations of UWB can be achieved by mixing discrete pulses with a carrier wave that controls a center frequency of a resulting UWB signal. Ultra-wideband generally requires neither an assigned frequency nor a power amplifier.

Figure 2:
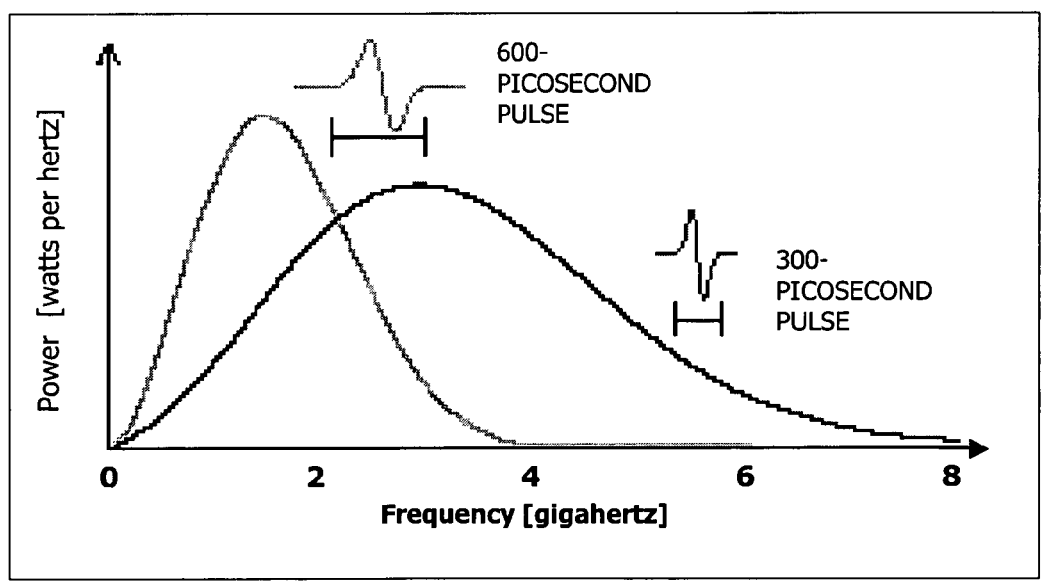
FIG. 2 is an illustration of two ultra-wideband pulses.

In contrast to the relatively narrow frequency spread of conventional communication technologies, a UWB pulse may have a 2.0 GHz center frequency, with a frequency spread of approximately 4 GHz, as shown in FIG. 2, which illustrates two typical UWB pulses. FIG. 2 illustrates that the narrower the UWB pulse in time, the broader the spread of its frequency spectrum. This is because bandwidth is inversely proportional to the time duration of the pulse. A 600-picosecond UWB pulse can have about a 1.6 GHz center frequency, with a frequency spread of approximately 1.6 GHz. And a 300-picosecond UWB pulse can have about a 3 GHz center frequency, with a frequency spread of approximately 3.2 GHz. Thus, UWB pulses generally do not operate within a specific frequency, as shown in FIG. 1. And because UWB pulses are spread across an extremely wide frequency range or bandwidth, UWB communication systems allow communications at very high data rates, such as 100 megabits per second or greater. A UWB pulse constructed according to the present invention may have a duration that may range between about 10 picoseconds to about 100 nanoseconds.

Further details of UWB technology are disclosed in U.S. Pat. No. 3,728,632 (in the name of Gerald F. Ross, and titled: Transmission and Reception System for Generating and Receiving Base-Band Duration Pulse Signals without Distortion for Short Base-Band Pulse Communication System), which is referred to and incorporated herein in its entirety by this reference.

Also, because the UWB pulse is spread across an extremely wide frequency range, the power sampled at a single, or specific frequency is very low. For example, a UWB one-watt pulse of one nano-second duration spreads the one-watt over the entire frequency occupied by the UWB pulse. At any single frequency, such as at the carrier frequency of a CATV provider, the UWB pulse power present is one nano-watt (for a frequency band of 1 GHz). This is calculated by dividing the power of the pulse (1 watt) by the frequency band (1 billion Hertz). This is well within the noise floor of any communications system and therefore does not interfere with the demodulation and recovery of the original signals. Generally, for wireless communication, the multiplicity of UWB pulses are transmitted at relatively low power (when sampled at a single, or specific frequency), for example, at less than −30 power decibels to −60 power decibels, which minimizes interference with conventional radio frequencies. However, UWB pulses transmitted through most wire media will not interfere with wireless radio frequency transmissions. Therefore, the power (sampled at a single frequency) of UWB pulses transmitted though wire media may range from about +30 dBm to about −140 dBm.

The present invention may be employed in any type of network, be it wireless, wired, or a mix of wire media and wireless components. That is, a network may use both wire media, such as coaxial cable, and wireless devices, such as satellites, or cellular antennas. As defined herein, a network is a group of points or nodes connected by communication paths. The communication paths may be connected by wires, or they may be wirelessly connected. A network as defined herein can interconnect with other networks and contain subnetworks. A network as defined herein can be characterized in terms of a spatial distance, for example, such as a local area network (LAN), a personal area network (PAN), a metropolitan area network (MAN), a wide area network (WAN), and a wireless personal area network (WPAN), among others. A network as defined herein can also be characterized by the type of data transmission technology in use on it, for example, a TCP/IP network, and a Systems Network Architecture network, among others. A network as defined herein can also be characterized by whether it carries voice, data, or both kinds of signals or data. A network as defined herein can also be characterized by who can use the network, for example, a public switched telephone network (PSTN), other types of public networks, and a private network (such as within a single room or home), among others. A network as defined herein can also be characterized by the usual nature of its connections, for example, a dial-up network, a switched network, a dedicated network, and a nonswitched network, among others. A network as defined herein can also be characterized by the types of physical links that it employs, for example, optical fiber, coaxial cable, a mix of both, unshielded twisted pair, and shielded twisted pair, among others.

The present invention may also be employed in any type of wireless network, such as a wireless PAN, LAN, MAN, WAN or WPAN. The present invention can be implemented in a "carrier free" architecture, which does not require the use of high frequency carrier generation hardware, carrier modulation hardware, stabilizers, frequency and phase discrimination hardware or other devices employed in conventional frequency domain communication systems. The present invention dramatically increases the bandwidth of conventional networks that employ wire media, but can be inexpensively deployed without extensive modification to the existing wire media network.

Another feature of the present invention is that it employs a variety of different methods of modulating a multiplicity of ultra-wideband pulses. The pulses can be transmitted and received wirelessly, or through any wire medium, whether the medium is twisted-pair wire, coaxial cable, fiber optic cable, or other types of wire media.

Yet another feature of the present invention is that it provides an UWB pulse transmission method that increases the available bandwidth of a communication system by enabling the simultaneous transmission of conventional carrier-wave signals and UWB pulses.

The different modulation and UWB pulse transmission methods enable the simultaneous coexistence of the ultra-wideband pulses with conventional carrier-wave signals. The present invention may be used in wireless and wire communication networks such as hybrid fiber-coax networks.

Thus, the ultra-wideband pulses transmitted according to the methods of the present invention enable an increase in the bandwidth, or data rates of a communication system.

One feature of the present invention has the capability to receive and transmit UWB, and non-UWB data over a multitude of media types. The present invention may perform the physical interface, logic and routing functions of bridging, or transferring UWB, and non-UWB data between dissimilar conductive media types. As mentioned above, the present invention provides a system, methods, and apparatus that can communicate between, or "bridge" between different communications technologies. Generally, these communication technologies are designed and characterized by the type of communication media that they employ. Broadly, virtually all communication media can be grouped into two types: wire and wireless. Additionally, this invention is concerned with essentially two types of communication: ultra-wideband (UWB—as defined above), and conventional, narrowband radio frequency (RF) technology, as also defined above. Combining the above four choices (wire, wireless, UWB and conventional) results in the following TABLE 1, which lists the possible combinations of communication technology and transmission media.

TABLE 1

| |
| --- |
| Wire UWB → Wire UWB |
| Wire UWB → Wire Conventional |
| Wire UWB → Wireless UWB |
| Wire UWB → Wireless Conventional |
| Wireless UWB → Wire UWB |
| Wireless UWB → Wire Conventional |
| Wireless UWB → Wireless UWB |
| Wireless UWB → Wireless Conventional |
| Wire Conventional → Wire UWB |
| Wire Conventional → Wire Conventional |
| Wire Conventional → Wireless UWB |
| Wire Conventional → Wireless Conventional |
| Wireless Conventional → Wire UWB |
| Wireless Conventional → Wire Conventional |
| Wireless Conventional → Wireless UWB |
| Wireless Conventional → Wireless Conventional |

Some of the above combinations are well known, such as wire conventional to wire conventional, or wireless conventional to wireless conventional. Thus techniques to bridge, or transfer data between these types of known combinations are also known. However, one feature of the present invention is that it may be employed as a communication bridge between known combinations, for a variety of reasons. For example, a bridge node, or communication bridge constructed according to the present invention may receive a narrowband, or conventional wire signal containing data and subsequently transmit the data through another wire, using a conventional, narrowband sine wave carrier.

However, the bridge node may perform several functions during the receipt and subsequent transmission of the data, whether it is received in via narrowband or UWB technology. For example, functions that may be performed by the present invention include receiving, transmitting, input/output (I/O) control, routing, addressing, modulation, demodulation, load balancing, appropriate UWB pulse width and envelope shape determination for the media, appropriate UWB pulse transmission rate determination, buffering and reformatting.

As shown in TABLE 1, it is anticipated that the received data may or may not include data that is transmitted using UWB pulses. Many different types of wire media may be employed by the present invention. For example, the wire media may include any combination of fiber optic cable, coax, powerline, and copper media such as phone lines or CAT 5 network cabling. These media may be thought of a the "physical layer" of a communication system. The "physical layer" may also include the specific types of connectors used on a communication device, for example, an S-video cable interface (for audio and video), Ethernet ports, IEEE 1394 and USB ports, and other busses, or connectors. The "physical layer" may also include the computer processor. These may be microprocessors, digital signal processors, general purpose processors, or finite state machines.

In a communication system, the data that is transported through the media (wire or wireless), and manipulated by the computer processors, is managed, in part, by the Media Access Control (MAC). The MAC comprises a protocol, or set of rules that determine, in part, when and how data is to be received, demodulated, modulated and transmitted. Thus, communication systems employ both a MAC and an physical layer (or PHY).

Different conventional narrowband communication standards and networks, as defined above, have their own MAC's. For example, DOCSIS is a cable modem standard, and Bluetooth is a LAN standard. Many of these MACs cannot communicate with each other. One feature of the present invention is that it can communicate with different MACs. That is, data may be received using one protocol, or set of communication rules, and subsequently transmitted using another set of communication rules.

Alternatively, the present invention may interface with different physical layers, or PHY's. In this embodiment, the present invention may comprise one, or more MACs that can communicate with different PHYs. This enables the present invention function as a "bridge" between different communication technologies.

Generally, with regard to ultra-wideband communication, one embodiment of the present invention bridges datastreams between different media by controlling one or more variables. For example, these variables may include: the UWB pulse transmission rate; pulse power; pulse duration; pulse envelope shape; and data modulation technique for the media. In media where the UWB datastream must coexist with other data, a pseudo-random pulse transmission rate may be employed.

For example, when communicating through wire media used for CATV, several variables must be considered. The radio frequency spectrum generated by a UWB pulse is directly related to the UWB pulse's width (as described above) and its shape. The inherent bandwidth limitations of some transmission media may require longer duration pulses. For example, the downstream bandwidth available in the North American CATV market is approximately 750 MHz. This corresponds to UWB pulse durations of approximately 1.3 nanoseconds. Thus, in this communication environment, UWB pulse duration may be adjusted.

However, in a wireless environment, pulse durations in the hundreds of picoseconds may be desirable. When bridging data between these media (CATV to wireless), the transmitted pulse duration may be different than the received pulse duration. In order to avoid interfering with CATV signals, the overall shape of the UWB pulse may be manipulated to adjust the distribution of the pulse's spectral energy. In an environment where there are known narrowband transmitters present, notch filters may be employed to prevent UWB pulse energy in that portion of the spectrum. Some of these considerations may be different between wireless and wire media. One feature of the present invention is that these variables, as well as others, are considered, and corresponding adjustments, such as adjustment of pulse width, are performed, which allows for optimization of the UWB pulses to a particular media type, and communication protocol.

Common to all forms of electromagnetic communication is modulation of the carrier signal by a data source. The signal may comprise a conventional, narrowband sine wave, or it may comprise a plurality of ultra-wideband pulses. A number of modulation schemes are well known in the communication art. The following is a discussion of a number of different data modulation methods that may employed by the present invention. For example, data modulated as described below may be received and/or transmitted by a communication bridge constructed according to the present invention.

Figure 3:
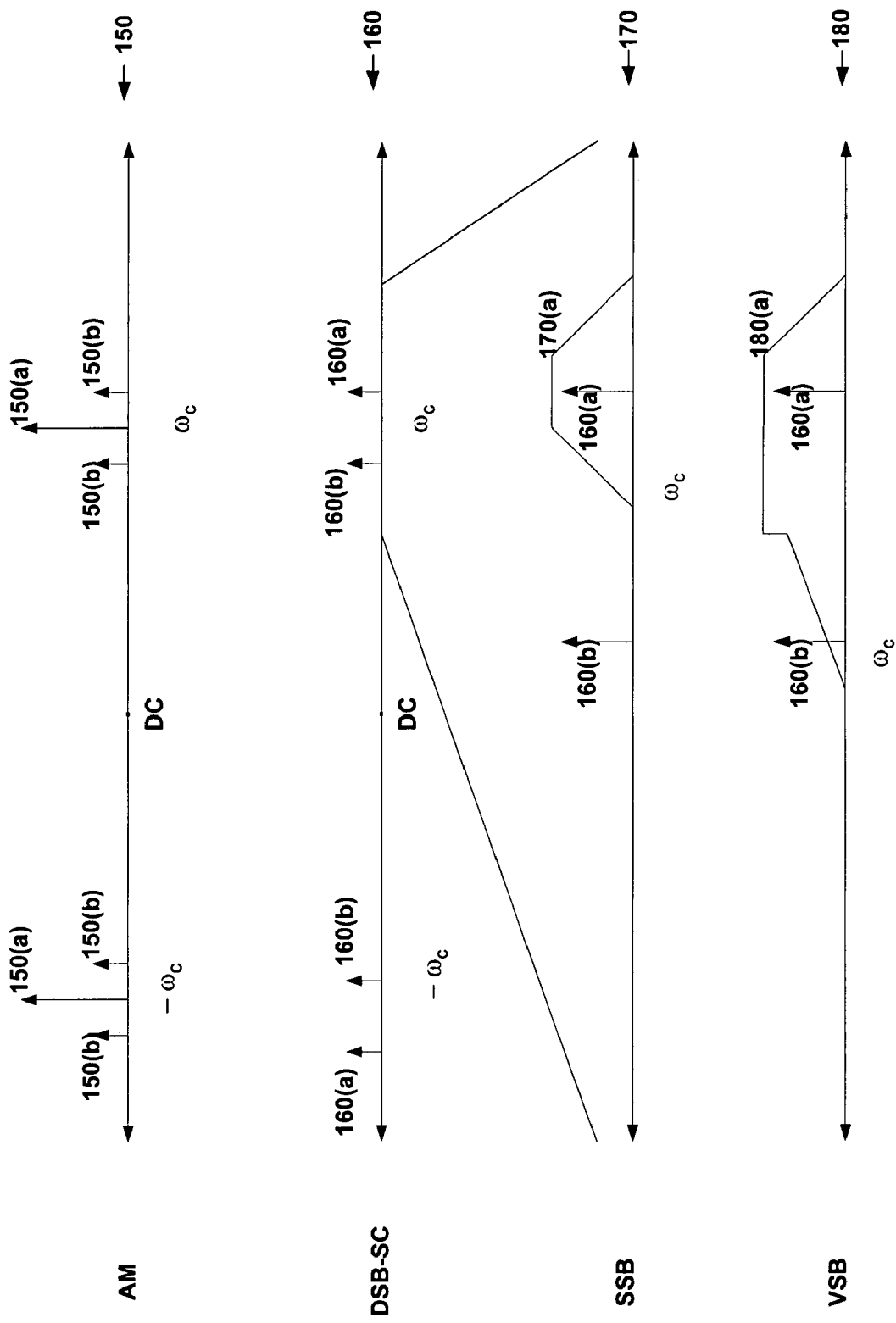
FIG. 3 illustrates the frequency spectrum of various communications signals.

Referring to FIG. 3, in Amplitude Modulation (AM) the amplitude of the carrier signal is modulated with a data signal to produce a signal suitable for transmission. In conventional AM a data signal [A+m(t)], where A is a constant, is multiplied or mixed with a sinusoidal carrier signal to produce a composite signal that has the desired characteristics of baseband data on a carrier at a desired frequency. The resultant frequency spectrum 150, as shown in FIG. 3, where the larger impulses 150(a) represent the frequency of the carrier and the lower amplitude impulses 150(b) represent the frequency content of m(t).

A number of methods can be used to demodulate AM signals. Since the transmitted signal is the product [A+m(t)] $\cos(\omega_c t)$, multiplying the received signal by a carrier at the same frequency will result in the following:

$$y(t) = [A + m(t)]\cos(\omega_c t)$$
$$y(t)\cos(\omega_c t) = [A + m(t)]\cos^2(\omega_c t)$$
$$y(t)\cos(\omega_c t) = \frac{1}{2}[A + m(t)][1 + \cos(2\omega_c t)]$$
$$y(t)\cos(\omega_c t) = \frac{1}{2}[A + m(t)] + \frac{1}{2}[A + m(t)][\cos(2\omega_c t)]$$

The resultant signal can then be filtered with a low pass filter having a cutoff frequency below $2\omega_c t$, which will attenuate the high frequency portion of the signal. After blocking the DC portion (A) the desired signal m(t) is recovered. Since this coherent or homodyne receiver architecture requires local generation and synchronization of a carrier frequency other methods of AM demodulation, such as the use of an envelope detector, have been developed and are well known in the art of communications.

Again referring to FIG. 3, another variant of AM is known as Dual Sideband Suppressed Carrier (DSB-SC). In DSB-SC the data, or modulating signal is directly multiplied with a carrier wave, without the DC constant A. The resultant signal y(t) can be expressed as y(t)=m(t) $\cos(\omega_c t)$. Since the constant A is no longer present in the transmitted signal, the carrier and its associated power is not separately transmitted. The DSB-SC frequency spectrum 160 signal is shown in FIG. 3, where the frequency content of m(t) is centered in two sidebands 160(a) and 160(b) that are symmetric around the carrier frequency $\omega_c$. Since the carrier is not present in the received signal a coherent or homodyne receiver may be used to demodulate the DSB-SC signal.

As shown in FIG. 3, the signal content is identical in both the upper sideband 160(a) and the lower sideband 160(b). Another variant of AM has been developed that exploits this symmetry. In Single Sideband (SSB) transmission 170, one of the two sidebands is transmitted. In some implementations of SSB a bandpass filter 170(a) is used to select one sideband and attenuate the other. The signal is then transmitted. In another implementation the DSB-SC signal is passed through a filter that delays the frequency components by $$\frac{\pi}{2}$$

without changing the amplitude of the signal. This process implements the Hilbert Transform of the original DSB-SC yielding a single sideband. Demodulation of SSB signals is similar to DSB signals. If the carrier is present in the SSB signal, SSB+C, then non-coherent demodulation, with envelope detection as discussed above, is possible. In the case where the carrier is not present, coherent demodulation is required.

There are inherent difficulties in the generation of SSB signals. Generation by phase shift, the Hilbert Transform method discussed above, requires the use of a filter that is only partially realizable. Systems employing that method typically use an approximation of the perfect filter. The selective bandpass filtering method requires a DC null in the modulating signal spectrum. DSB-SC signals are significantly easier to generate but consume twice the bandwidth of the SSB signals. With these difficulties in mind another variant of AM called Vestigial Sideband (VSB) signal transmission 180 has been developed and is widely used in analog CATV systems. VSB is similar in nature to a SSB selective filtering in that a bandpass filter is used to pass one sideband and attenuate the other sideband. As shown in FIG. 3, VSB 180 differs from SSB 170 in that the filter 170(a) is asymmetric and allows a gradual cutoff of the rejected sideband. The bandwidth of the VSB signal is approximately 25% greater than the SSB signal but avoids many of the above difficulties in SSB systems.

Demodulation of VSB signals is similar to SSB signals. When the carrier is present in the VSB signal, known as VSB+C, non-coherent demodulation with an envelope detector is possible. When the carrier is not present, the demodulation is accomplished with a coherent demodulator as described above.

Another modulation technique that involves AM is known as Quadrature Amplitude Modulation (QAM). In QAM two carriers are amplitude modulated with data. The carriers are orthogonal with respect to each other, which allows for simultaneous transmission and reception without interference between the carriers. In QAM a single carrier, $\cos(\omega_c t)$ is generated and phase shifted by $$\frac{\pi}{2}$$

to produce $\sin(\omega_c t)$. The in-phase (I) channel is the $\cos(\omega_c t)$ carrier and the quadrature (Q) channel is the $\sin(\omega_c t)$ carrier. Two data signals $m_1(t)$ and $m_2(t)$ are then mixed with the I and Q channels to produce AM modulated carriers. The resultant signals are then summed prior to transmission. Since $\cos(\omega_c t)$ and $\sin(\omega_c t)$ are mutually orthogonal, this summation does not cause interference. QAM signals are demodulated in a similar coherent manner. A carrier $\cos(\omega_c t)$ is generated at the same frequency and phase shifted to produce $\sin(\omega_c t)$. These signals are mixed with the received signal and filtered with a lowpass filter to attenuate the high frequency components produced by mixing. The resulting signals are then recovered from the output of the lowpass filter.

A similar modulation technique called Orthogonal Frequency Division Multiplexing (OFDM) takes advantage of orthogonality constraints on carriers to extend this concept. In OFDM multiple data streams, or alternatively subsets of the same data stream are modulated onto a number of orthogonal carriers. OFDM can be accomplished with the use of a transformation matrix such as the Inverse Fast Fourier Transform (IFFT) matrix. In OFDM the data channels are multiplied by the IFFT matrix resulting in a set of modulated orthogonal carriers. The set of carriers may overlap in the frequency domain without interference due to their orthogonal nature.

Angle modulation methods include phase and frequency modulation. Unlike AM methods angle modulation methods are non-linear. In angle modulation methods the data is modulated onto the frequency or phase of the carrier wave. Recovering the instantaneous phase or frequency of the carrier demodulates the data. Angle modulated waveforms (PM for phase modulation, and FM for frequency modulation) can be mathematically described as:

$$PM(t) = A\cos(\omega_c t + k_p m(t))$$

$$FM(t) = A\cos(\omega_c t + k_f \int m(t)dt)$$

Demodulation of angle-modulated signals can be accomplished in a number of ways. On a mathematical basis the derivative of the above signals yields the following:

$$\frac{d}{dt}PM(t) = A\left(\omega_c + k_p \frac{dm(t)}{dt}\right)\sin(\omega_c t + k_p m(t))$$

$$\frac{d}{dt}FM(t) = A(\omega_c + k_f m(t))\sin\left(\omega_c t + k_f \int m(t)dt\right)$$

Since the resultant signals are both amplitude and angle modulated, an envelope detector may be used to detect the amplitude component of the signals yielding the following:

$$y_p = A\left(\omega_c + k_p \frac{dm(t)}{dt}\right)$$

$$y_f = A(\omega_c + k_f m(t))$$

In both cases the data signal m(t) may then be recovered.

A method of demodulation using a Phase Locked Loop (PLL) is additionally known in the art and is in wide use for angle modulated signals. In a PLL circuit a Voltage Controlled Oscillator (VCO) provides a reference signal at the carrier frequency. The output of the VCO is multiplied or mixed with the incoming signal. This produces a signal with a low frequency component and a frequency component at approximately twice the carrier frequency. This signal is lowpass filtered to attenuate the high frequency component. The resulting low frequency signal is proportional to the difference between the instantaneous frequency of the incoming signal and the locally generated carrier frequency. This error signal is therefore proportional to the data contained in the incoming signal.

Regarding communication techniques for ultra-wideband (UWB) technology, two different development paths have recently appeared. One path known as multi-band UWB generates UWB signals of longer duration in time with differing center frequencies. In this approach to UWB, the pulses may occupy bandwidths of hundreds of MHz. In this type of UWB system the frequency bands may be used to provide a method of data modulation or may provide channelization for users in a UWB network. In one UWB multi-band modulation technique the data is carried on the frequency bands that the UWB pulse occupies. In another modulation technique the data is represented by the sequence in time that each frequency band is hopped. When used for channelization, different users occupy different frequency bands. In one multi-band approach the UWB pulses are generated to be orthogonal which will allow for overlap of occupied frequency bands.

In another UWB implementation the pulse duration, or width may be conFIG.ured so that the frequency bandwidth occupied by the pulse is significantly larger than the multi-band approach. As discussed above, the frequency band of a single UWB pulse may be several Gigahertz. In this "single-band" UWB communication method system, processing gain and increased immunity to narrowband interference are an inherent feature of the increased pulse bandwidth. Additionally, since the pulse or pulses occupy a significantly larger bandwidth, each individual pulse may be transmitted at a higher power level and still stay within the emission limits established by the Federal Communications Commission. The higher power pulses of a single-band UWB system can be detected at a greater distance than the pulses of a multi-band UWB system. Additionally, since the multi-band UWB system may require a multiplicity of bandpass filters on the receiver, single-band receivers are usually less complicated and cheaper to build.

One feature of the present invention is that it provides methods of bridging data between different communication media, such as air (wireless) and cable, or copper (wire). However, the physical characteristics of different wire transmission media yield differences in their bandwidth capacity, and the present invention may change a variety of communication parameters in recognition of these differences. For example, coaxial cables used in the distribution of CATV signals are shielded and the usable bandwidth is approximately 750 to 800 MHz. The bandwidth of the Plain Old Telephone System (POTS) has been utilized by some DSL systems up to approximately 30 MHz. In powerline communication systems, the useful bandwidth within the home or office may only be 20–30MHz. Generally, the specific category rating of a twisted-pair wire, or cable determines its useful bandwidth.

Other considerations are important when transmitting UWB pulses on some media. Some wire media are shielded, which reduces the amount of emissions radiated when a signal is present. Shielded systems are therefore capable of higher transmission powers. Since UWB communication systems can spread the electromagnetic pulse energy across the available bandwidth, communications parameters may be adapted for the specific media used for transmission. Some transmission media have different inherent noise characteristics that may also be considered when transmitting UWB pulses. Additionally, in some communication media, there may be other communication signals present. In those situations, the UWB pulses may need to be altered to ensure coexistence with the other communication signals.

One embodiment of the present invention provides methods of providing different communication system parameters for UWB pulses based on the media characteristics described above. For example and not by way of limitation, a QAM signal may be received from a CATV system containing digital television video and audio content. The signal may be demodulated and retransmitted across a wireless UWB link using PPM modulation, with a pulse transmission rate of 100 MHz, using 400 picosecond duration pulses, each having a center frequency of about 4.25 GHz. In another example, an audio signal may be received from an FM radio station, demodulated and retransmitted across the powerlines of a home in a UWB format using On-Off-Keying (OOK), with a pulse transmission rate of about 1 MHz, with pulse durations of about 100 nanoseconds, each having a center frequency of about 5 MHz. In addition, both signals may be received in other parts of the home by UWB enabled transceivers.

In one feature of the present invention, the routing decision to determine which media to utilize for transmission may be based on the current UWB communication load present on the available media and the bandwidth demand on each medium. Additional considerations may be the bandwidth capacity of each medium and the bandwidth demand of the communications being transmitted. For example, high-definition (HD) video and audio may be appropriate for a wireless transmission medium or for a coaxial medium, but may not be appropriate for a powerline medium or a phone line due to the inherent bandwidth requirement for HD video and the limitations of the phone and power lines.

Figure 4:
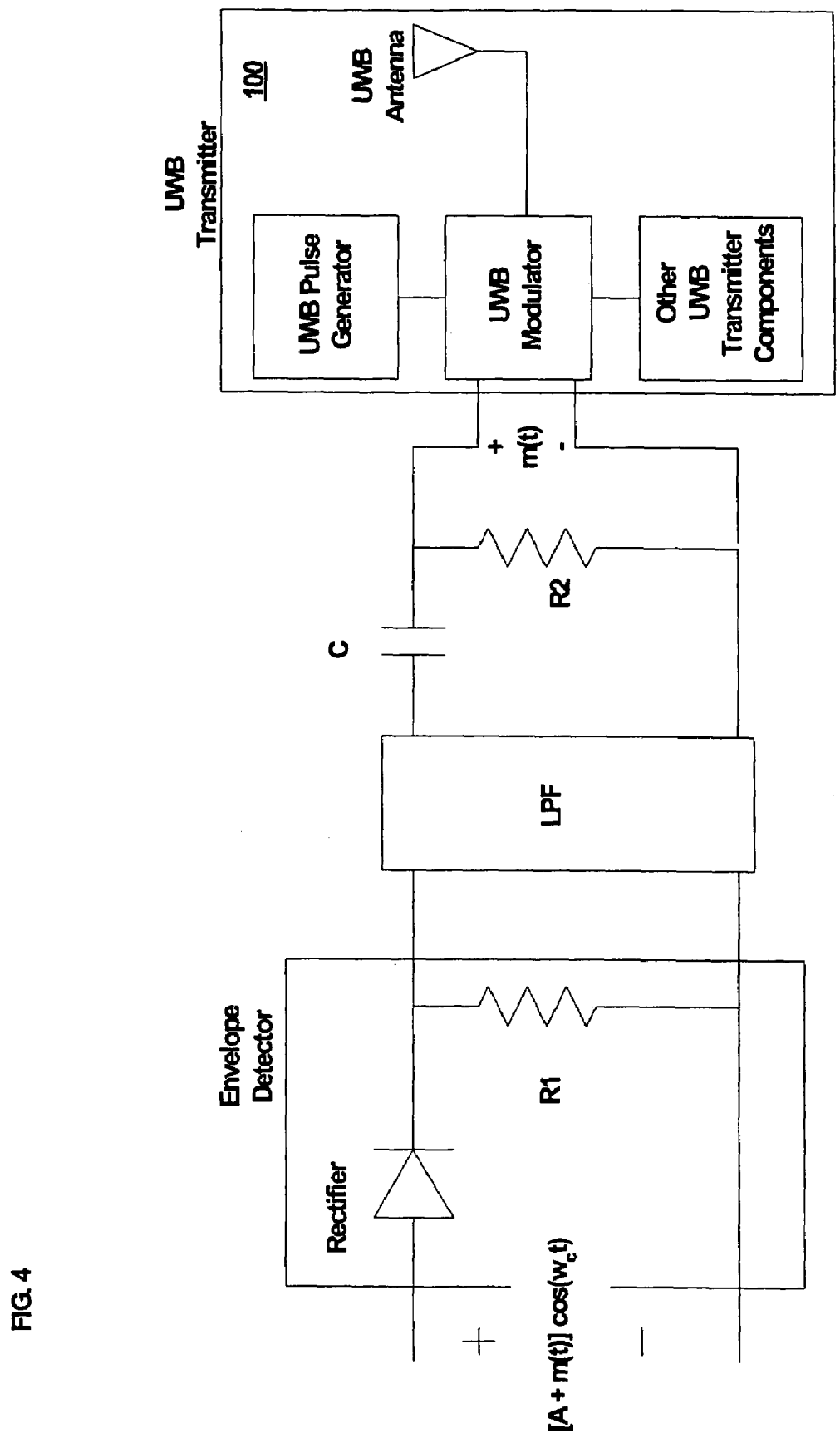
FIG. 4 illustrates the demodulation of a conventional, narrowband amplitude-modulated signal and re-transmission using an ultra-wideband communication format.
Figure 5:
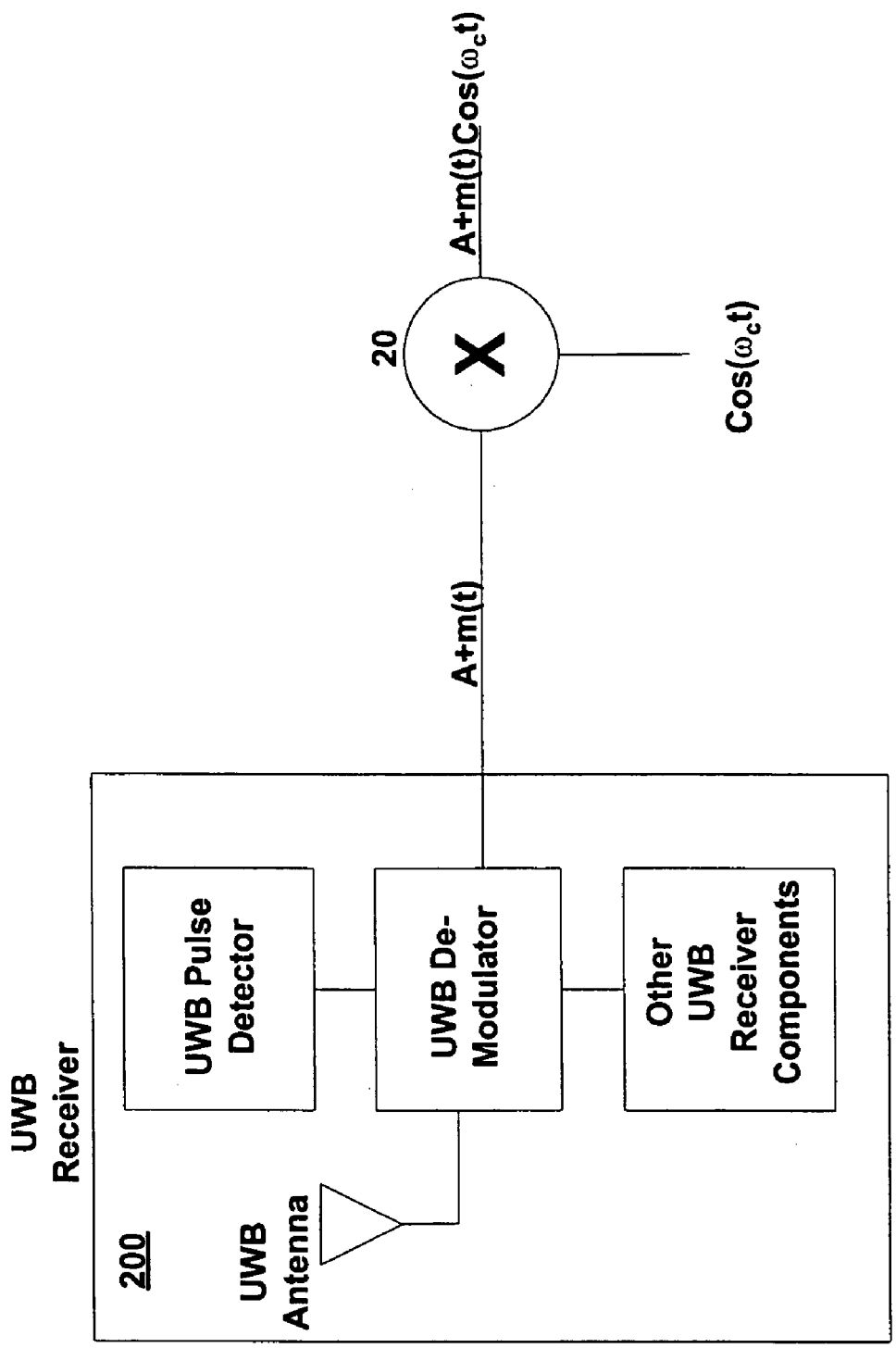
FIG. 5 illustrates the receipt of ultra-wideband formatted data and re-transmission of the data using a carrier-based amplitude-modulated signal.

Referring to FIG. 4 and FIG. 5, which illustrate the bridging of carrier based AM communications to and from a UWB transceiver, according to one embodiment of the present invention. The continuous AM waveform [A+m(t)]cos($\omega_c$t) arrives at the envelope detector comprised of a rectifier circuit, a resistive element R1, and any other suitable components, or their equivalents. As described above, the envelope detector's output is filtered by lowpass filter LPF. Capacitive element C blocks residual DC present in the signal and the recovered data signal m(t) is sent to the UWB transmitter 100. The UWB transmitter 100 may comprise a UWB modulator, a pulse generator and other UWB transmitter components, such as amplifiers, bandpass filters, transmit/receive switches to name a few. This form of non-coherent AM demodulation may be employed in demodulating any of the above-described AM variant signals when the carrier is present in the transmitted signal, such as AM, SSB+C, VSB+C (as discussed in connection with FIG. 3).

Referring again to FIG. 5, in like manner a UWB receiver 200 comprised of an UWB antenna, pulse detector, UWB demodulator, and other UWB receiver components such as amplifiers, filters and a transmit/receive switch, receives a UWB signal and recovers the data in the form [A+m(t)]. This data signal is then mixed 20 with a carrier wave cos($\omega_c$t) to produce an AM continuous waveform suitable for transmission. As is well known in the art of communications a number of other AM modulation and demodulation circuits may be used to practice the invention.

Figure 6:
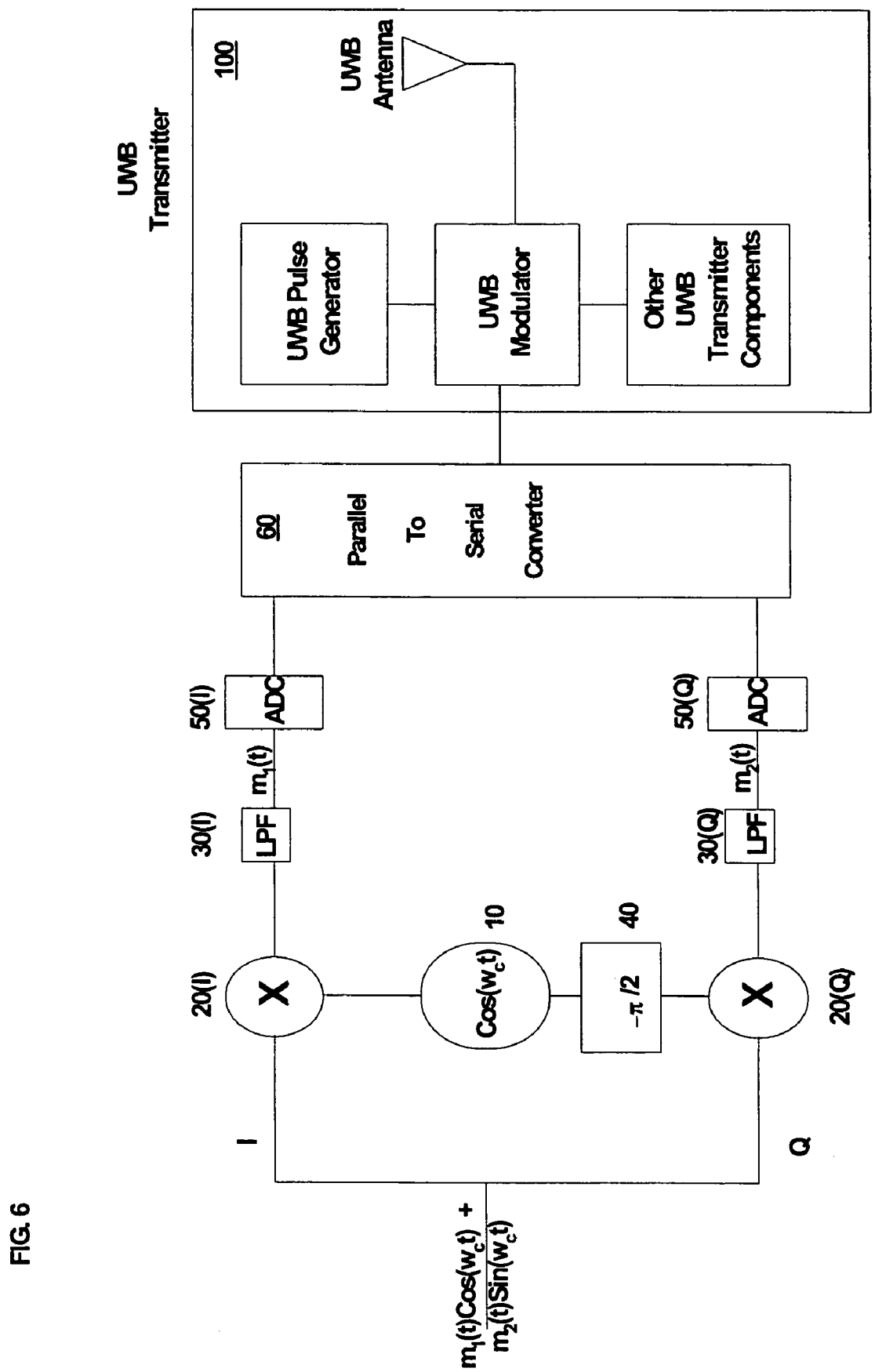
FIG. 6 illustrates demodulation of a conventional, narrowband QAM signal and re-transmission using an ultra-wideband communication format.
Figure 7:
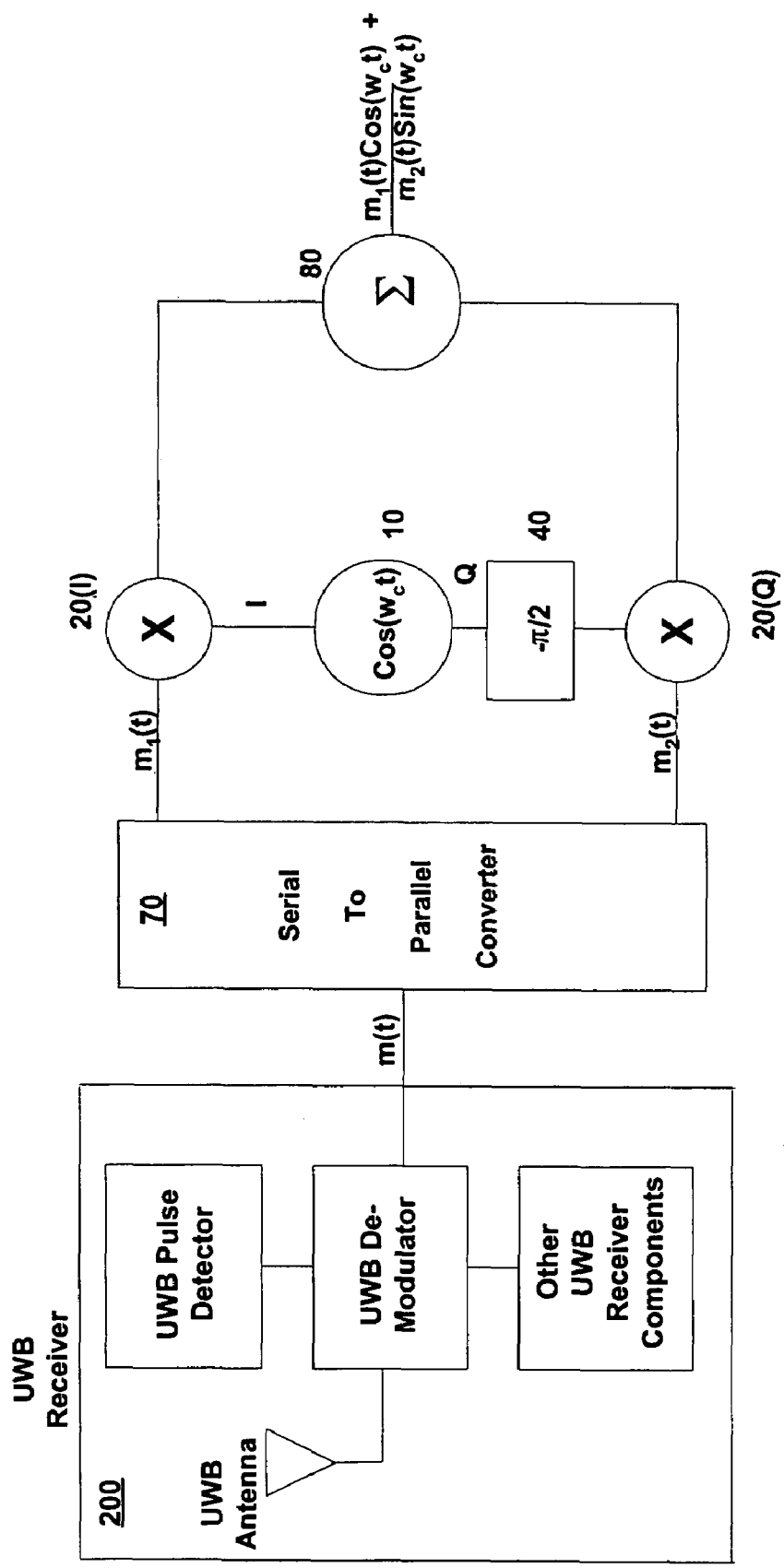
FIG. 7 illustrates the receipt of ultra-wideband formatted data and re-transmission of the data using a carrier-based QAM signal.

Referring now to FIG. 6 and 7, which illustrates the bridging of carrier based QAM signals to and from a UWB transceiver. A continuous carrier based QAM signal $m_1(t)$cos($\omega_c$t)+$m_2(t)$sin($\omega_c$t) is received. A local oscillator 10 generates a sinusoidal signal at the same frequency of the received signal cos($\omega_c$t). The locally generated signal is split between two channels I and Q. Phase shifter 40 imparts a $$-\frac{\pi}{2}$$

to the local signal for the Q channel. The incoming QAM signal is mixed with the two locally generated signals by mixers 20(I) and 20(Q). The resultant product of mixing contains a low frequency component and a frequency component at approximately twice the carrier frequency. Low pass filters (LPFs) 30(I) and 30(Q) attenuate the high frequency component of the mixed signals. The original data signals $m_1(t)$ and $m_2(t)$ are recovered from the output of the LPFs 30(I) and 30(Q). The signals $m_1(t)$ and $m_2(t)$ may then be quantized by Analog to Digital Converters (ADCs) 50(I) and 50(Q). Parallel to Serial Converter 60 takes the two quantized signals and interleaves them to produce one serial data stream. The data stream is then sent to the UWB transmitter 100 which may comprise a UWB modulator, a pulse generator and other UWB transmitter components such as amplifiers, Analog to Digital Converters, bandpass filters, transmit/receive switches, or their equivalents, to name a few.

Referring again to FIG. 7, in like manner a UWB receiver 200 comprised of an UWB antenna, pulse detector, UWB demodulator, and other UWB receiver components such as amplifiers, filters and a transmit/receive switch, receives a UWB signal and recovers the data in the form m(t) This data signal split into two signals $m_1(t)$ and $m_2(t)$ by Serial to Parallel Converter 70. Alternatively, the signals $m_1(t)$ and $m_2(t)$ may be from two distinct UWB receivers 200. In that embodiment, the Serial to Parallel Converter 70 is not used. A local oscillator 10 generates a carrier wave cos($\omega_c$t)at the desired frequency $\omega_c$. The locally generated signal is split into two channels I and Q. The locally generated signal on the Q channel is then shifted $$-\frac{\pi}{2}$$

in phase by phase shifter 40. The data signals $m_1(t)$ and $m_2(t)$ are then mixed with the carrier waves and summed by summer 80 to produce a QAM continuous waveform suitable for transmission. As is well known in the art of communications a number of other QAM modulation and demodulation circuits may be used to practice the invention.

Figure 8:
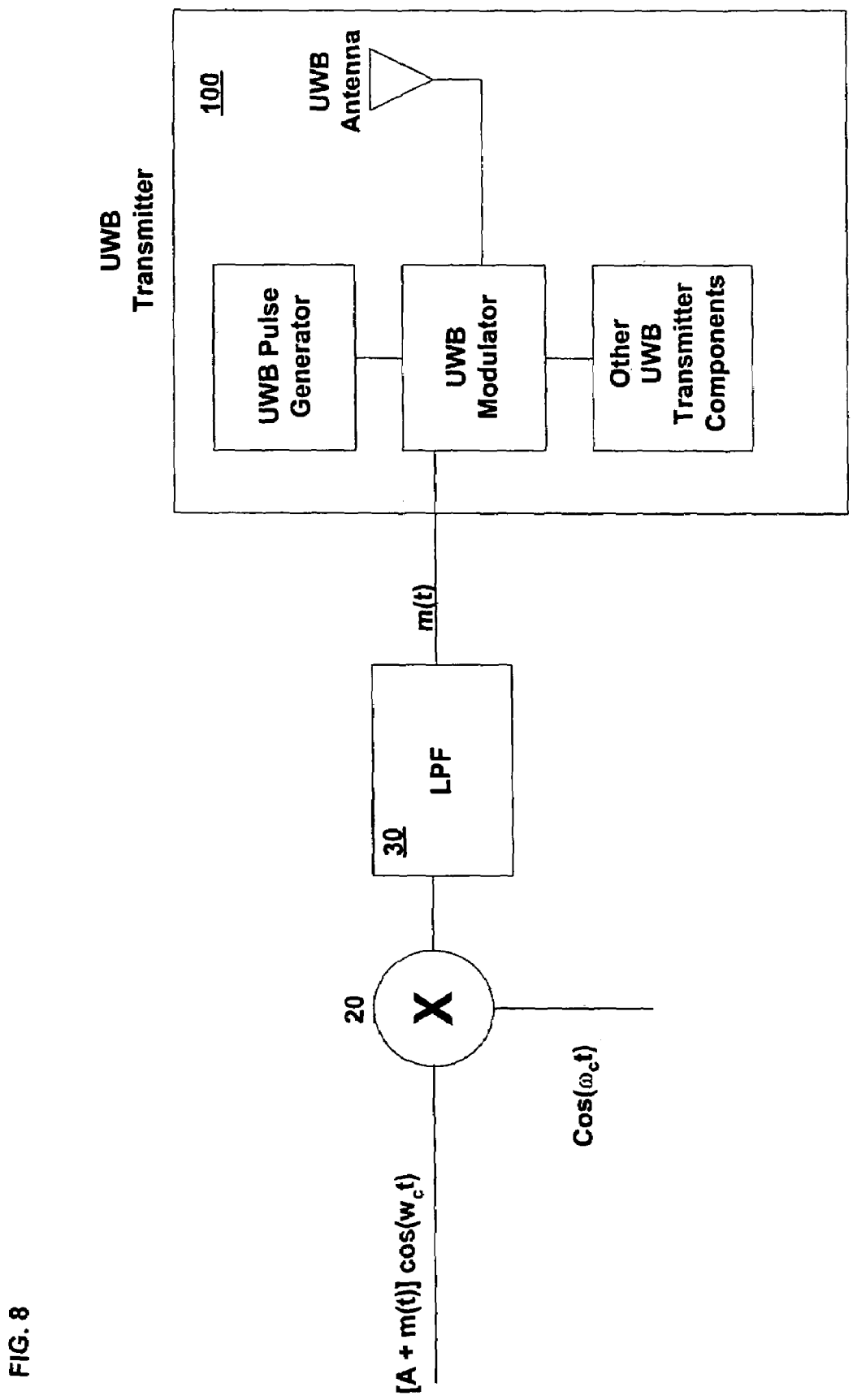
FIG. 8 illustrates the receipt and coherent demodulation of a continuous, narrowband signal and re-transmission using an ultra-wideband communication format.

Referring now to FIG. 8, which illustrates coherent demodulation of an AM signal. A continuous AM waveform is received. It is anticipated that the continuous AM waveform may be DSSB-SC, VSB, SSB (as discussed above in connection with FIG. 3) or the AM waveform depicted in FIG. 8. It is additionally known in the art of communications that a coherent demodulator may be used when a carrier is present in the received waveform. A local carrier cos($\omega_c$t) is generated and mixed with the incoming signal by mixer 20. The resultant signal is then filtered by low pass filter (LPF) 30 to eliminate the high frequency component produced by mixing the signal with the locally generated carrier to recover the data signal m(t). The data signal is then retransmitted by UWB transmitter 100 which may comprise a UWB modulator, a pulse generator and other UWB transmitter components such as amplifiers, Analog to Digital Converters, bandpass filters, transmit/receive switches, and their equivalents, to name a few. The filter 30 may be an asymmetric bandpass filter in the case of VSB demodulation. Other coherent demodulation techniques involving signal squaring are known and are included within the scope of the invention as well.

Figure 9:
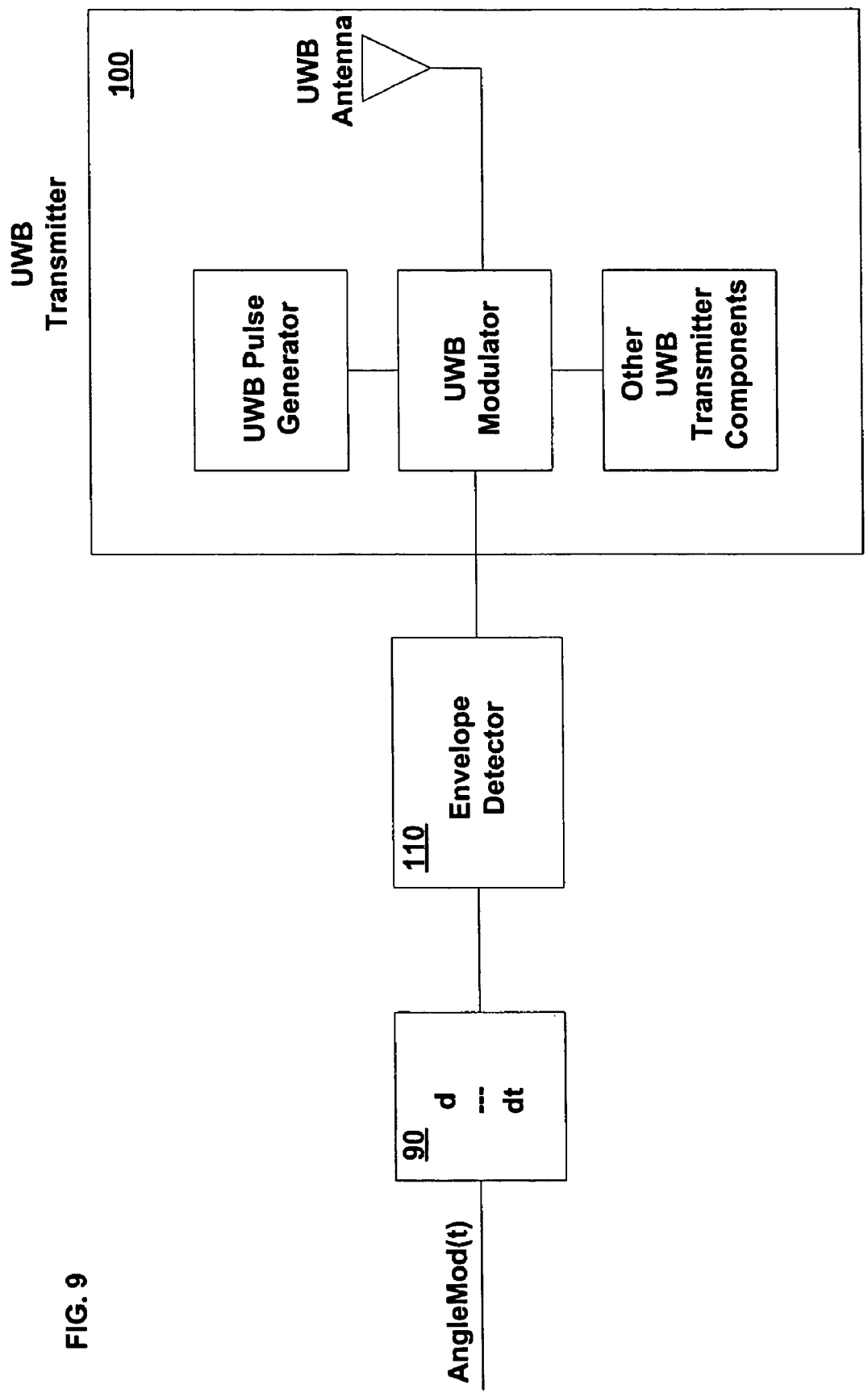
FIG. 9 illustrates the reception and non-coherent demodulation of a conventional, narrowband angle modulated signal and re-transmission using an ultra-wideband communication format.

Referring to FIG. 9, which illustrates the reception, demodulation of an angle modulated signal, and retransmission of data employing UWB pulses. As described above, angle modulated signals carry data in the instantaneous frequency or phase of the signal. The angle-modulated signal is received and differentiated by differentiator 90. The resultant signal is then applied to an envelope detector circuit 110. The envelope detector 110 returns the amplitude of the derivative of the angle-modulated signal. As described above, the data signal can then be recovered from the output of the envelope detector 110. The signal is then sent to the UWB transmitter 100 which may comprise a UWB modulator, a pulse generator and other UWB transmitter components such as amplifiers, Analog to Digital Converters, bandpass filters, transmit/receive switches, and their equivalents, to name a few.

Figure 10:
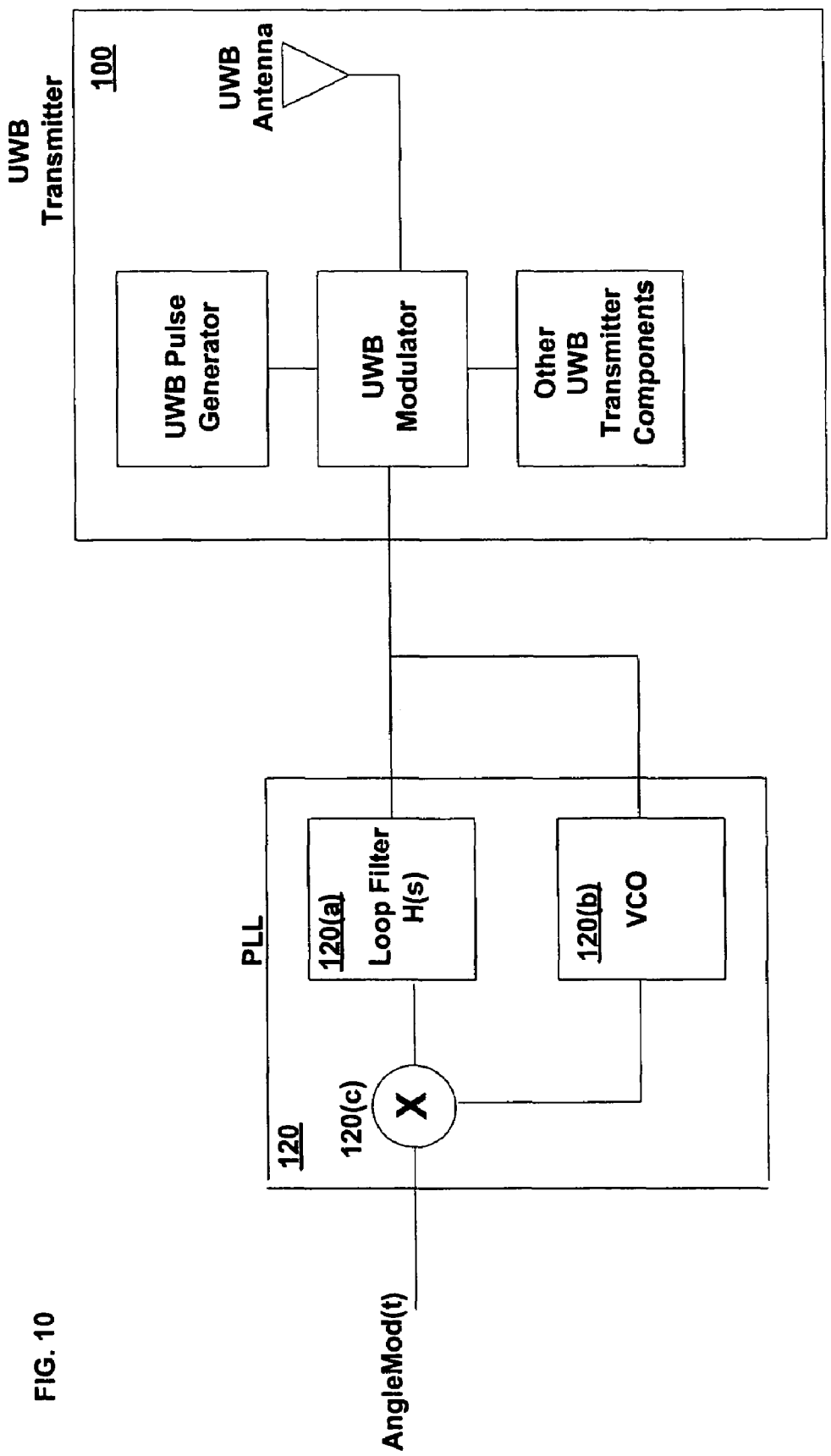
FIG. 10 illustrates the reception and demodulation of a conventional, narrowband angle modulated signal using a phase-locked-loop and re-transmission using an ultra-wideband communication format.

Referring specifically to FIG. 10, which illustrates another embodiment of the present invention. In this embodiment, the angle-modulated signal is received and sent to the phase-locked-loop (PLL) circuit 120. PLL circuit 120 comprises a multiplier 120(c), a loop filter 120(a), and a voltage controlled oscillator (VCO) 120(b). The output of the VCO 120(b) is multiplied with the incoming signal by multiplier 120(c). The resultant product has a low frequency component proportional to the difference in the frequency and phase of the two signals. Additionally, the product has a frequency component at approximately twice the carrier frequency. Loop Filter 120(a) has a cut-off frequency low enough to significantly attenuate this high frequency component. The output of the Loop Filter 120(a) is then fed back to the VCO as a control signal. Once the PLL is locked to the incoming waveform, the output of the Loop Filter 120(a) is zero since the signal generated by the VCO and the incoming signal are coherent in both frequency and phase. As the incoming signal changes in instantaneous frequency or phase due to the data, the output of the Loop Filter 120(a) is proportional to that change and therefore to the data carried by the signal. The data is then sent to a UWB transmitter 100 which may comprise a UWB modulator, a pulse generator and other UWB transmitter components such as amplifiers, Analog to Digital Converters, bandpass filters, transmit/receive switches, and their equivalents, to name a few. The UWB transmitter 100 then re-transmits the data employing UWB pulses. It is anticipated that other angle demodulation techniques may be employed by the present invention.

Figure 11:
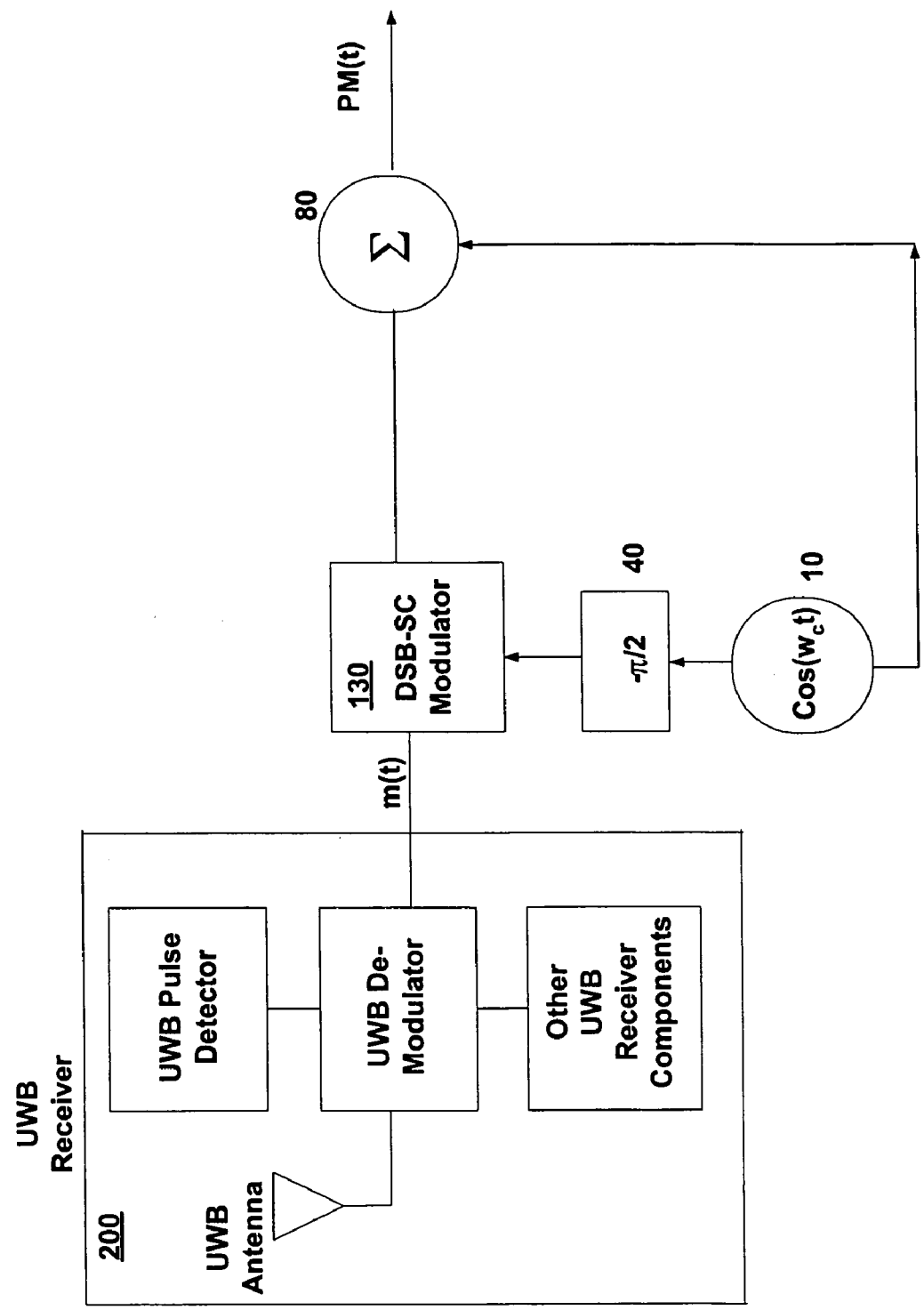
FIG. 11 illustrates the reception of ultra-wideband formatted data and re-transmission of the data using a phase angle-modulated continuous sine wave.

Referring now to FIG. 11, which illustrates the reception of a UWB signal and retransmission as a phase angle (PM(t)) modulated signal. UWB receiver 200 receives and demodulates m(t) from a UWB signal. Local oscillator 10 provides a locally generated carrier signal at the desired frequency $\omega_c$. The locally generated signal is split and one signal is shifted $$-\frac{\pi}{2}$$

in phase by phase shifter 40. The data signal is then modulated onto the phase-shifted signal by DSB-SC as described above. The modulated signal is then summed with the original non-phase shifted signal by summer 80. The resultant signal is an phase angle-modulated signal (PM(t)) where the data is carried by the instantaneous phase of the carrier. Other phase modulation techniques are known in the art and may be used to practice the invention as well.

Figure 12:
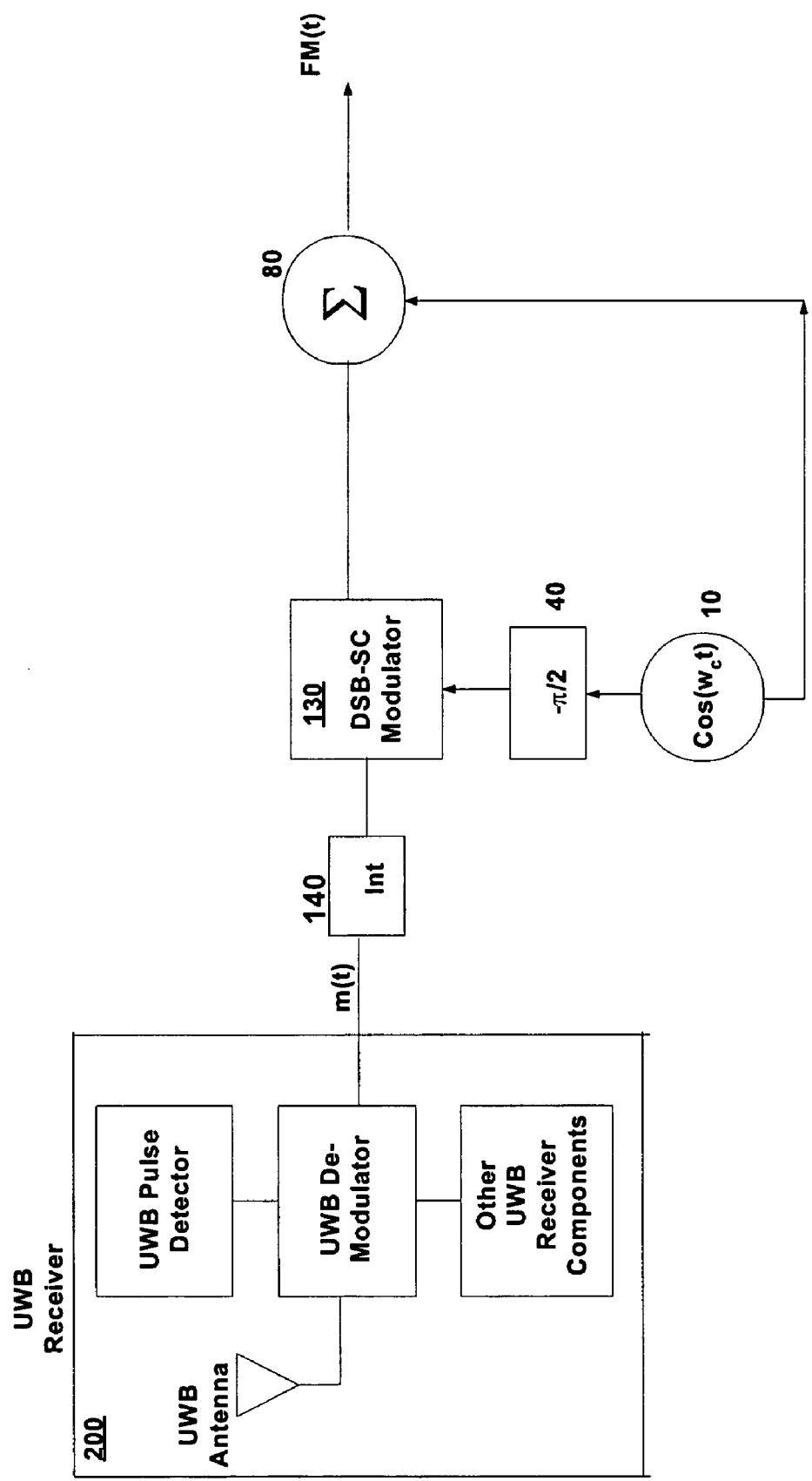
FIG. 12 illustrates the reception of ultra-wideband formatted data and re-transmission of the data using a frequency angle-modulated continuous sine wave.

Referring specifically to FIG. 12, which illustrates the reception of a UWB signal and retransmission as an frequency angle modulated signal (FM(t)). UWB receiver 200 receives and demodulates m(t) from a UWB signal. Local oscillator 10 provides a locally generated carrier signal at the desired frequency $\omega_c$. The locally generated signal is split and one signal is shifted $$-\frac{\pi}{2}$$

in phase by phase shifter 40. The data signal is then integrated by integrator 140 and modulated onto the phase-shifted signal by DSB-SC as described above. The modulated signal is then summed with the original non-phase shifted signal by summer 80. The resultant signal is a frequency angle-modulated signal (FM(t)) where the data is carried by the instantaneous frequency of the carrier. Other frequency modulation techniques are known in the art and may be used by the present invention as well.

Figure 13:
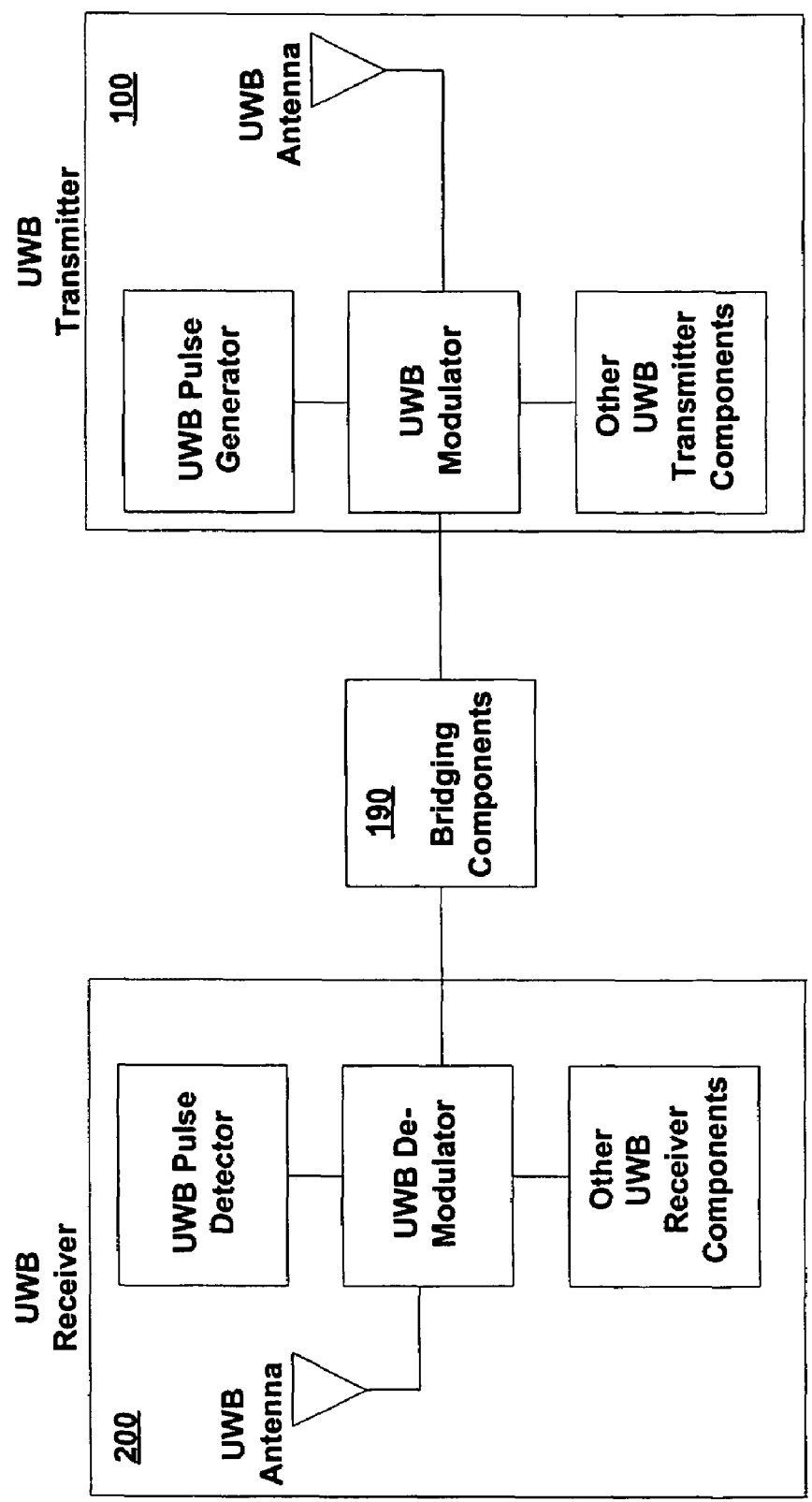
FIG. 13 illustrates the reception of data using one type of ultra-wideband format and re-transmission of the data using another type of ultra-wideband format.

Referring now to FIG. 13, which illustrates bridging data from one UWB protocol, or format to another UWB format. As described above, UWB communication may employ a multi-band approach or a single-band approach. In one embodiment of the present invention, UWB communication signals, in the form of a plurality of UWB pulses, are received by UWB receiver 200. As illustrated, the UWB receiver 200 may include an UWB antenna, a UWB pulse detector, a UWB demodulator, and other UWB receiver components, as described above. After the data is demodulated, it is re-formatted by bridging components 190 which may include a multiplicity of bandpass filters, a multiplicity of Analog to Digital converters, a multiplicity of amplifiers, parallel to serial converters, and serial to parallel converters to name a few components that may be used to reformat UWB pulses received in either a multi-band format or a single-band format for transmission in either a multi-band format or a single-band format. Transmission of the UWB pulses is through UWB transmitter 100. As illustrated, the UWB transmitter 100 may include an UWB antenna, a UWB pulse generator, a UWB modulator, and other UWB transmitter components, as described above. Generally, in a case where multi-band formatted UWB pulses are received, the bridging components 190 would shorten, or shape the UWB pulses. For example, a multi-band UWB pulse may have a duration of about 2 nanoseconds, which corresponds to about a 500 MHz bandwidth. However, a single-band UWB pulse may have a duration of about 400 picoseconds, which corresponds to about a 2.5 GHz bandwidth.

In another embodiment of the present invention, the bridging components 190 may include buffers to be used when bridging UWB communication pulses to and from media requiring different pulse durations. Additionally, this embodiment may include pre-distortion and other pulse shaping circuits to optimize the UWB pulses for the second transmission medium.

Figure 14:
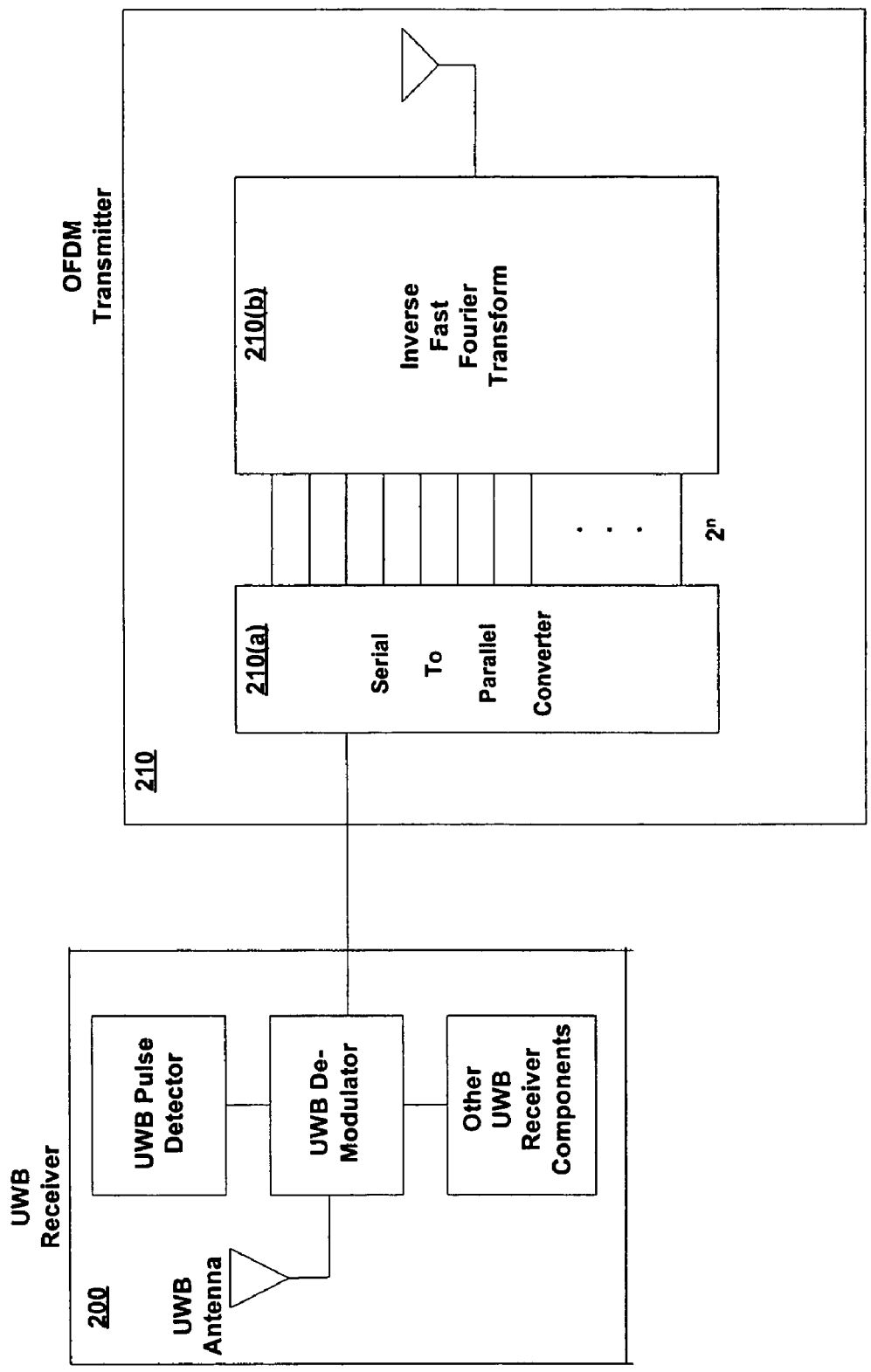
FIG. 14 illustrates the reception of ultra-wideband formatted data and re-transmission of the data using an OFDM continuous sine wave.

Referring to FIG. 14, which illustrates the bridging of UWB formatted data to a conventional sine wave OFDM communication format, or protocol. UWB receiver 200 (constructed as described above) receives a plurality of UWB pulses. The data is demodulated from these pulses and sent to OFDM transmitter 210. As described above, OFDM transmitter comprises Serial to Parallel Converter 210(a) which converts the data signal into a parallel data set. Orthogonal transformation of the parallel data set is accomplished by Inverse Fast Fourier Transform 210(b) resulting in an OFDM signal, which is then transmitted using known conventional, narrowband signal transmission methods.

Figure 15:
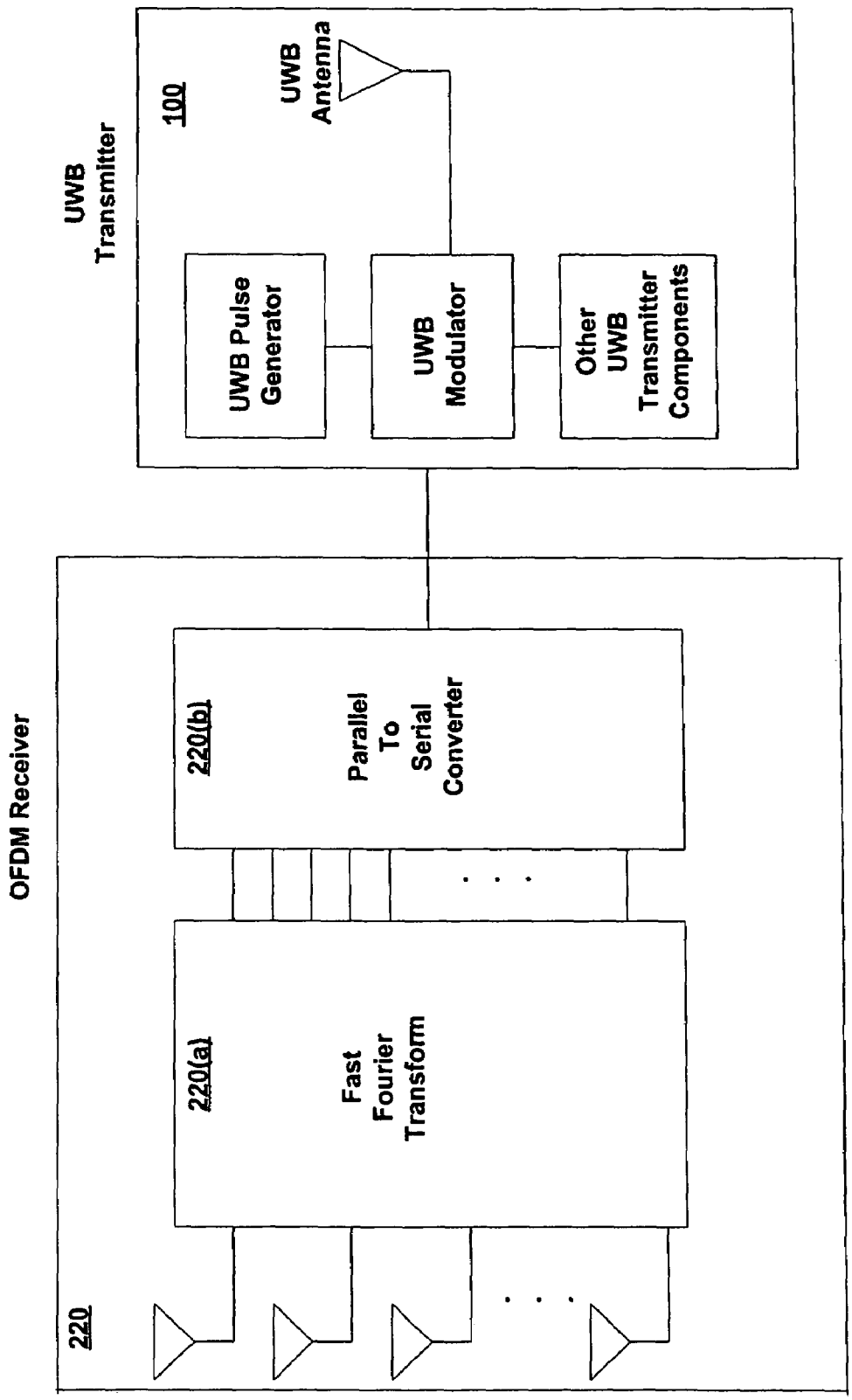
FIG. 15 illustrates the reception and demodulation of a conventional, narrowband OFDM signal and re-transmission using an ultra-wideband communication format.

Referring finally to FIG. 15, which illustrates the bridging of conventional, narrowband OFDM signals to UWB pulses. The OFDM receiver 220 may comprise a multiplicity of antennas, a multiplicity of receiver chains (not shown), an orthogonal matrix transformation such as a Fast Fourier Transform 220(*a*), and a Parallel to Serial Converter 220(*b*). In practice, the OFDM receiver 220 receives an OFMD data signal, demodulates and serializes the data and sends it to the UWB transmitter 100. The UWB transmitter 100 retransmits the data in a UWB format employing a plurality of UWB pulses. This is accomplished by modulating the data using a UWB modulator, a UWB pulse generator, a UWB antenna, and other UWB transmitter components, as described above.

As discussed above, one feature of the present invention is that it can communicate between, or "bridge" between different communication technologies. In one embodiment of the present invention, a conventional narrowband radio frequency receiver receives data. The data is then demodulated and retransmitted using ultra-wideband (UWB) communication technology. The communication may be through either wireless or wire media. In another embodiment, this process may be reversed, and a plurality of UWB pulses may be received, demodulated and then transmitted using a conventional, narrowband sinusoidal waveform.

Described above in connection with FIGS. 4, 6, 8, 9, 13, and 15 are methods and apparatus that modulate data from received signals, whether the signals are conventional, narrowband sine wave signals, or a plurality of ultra-wideband electromagnetic pulses. For example, FIG. 4 shows an ultra-wideband (UWB) modulator that is included within a UWB transmitter 100. This arrangement is also illustrated in FIGS. 6, 8, 9, 10, 13 and 15.

Also described above in connection with FIGS. 5, 7, 11, 12, 13 and 14 are methods and apparatus that demodulate transmitted data from received signals, whether the signals are conventional, narrowband sine wave signals, or a plurality of ultra-wideband electromagnetic pulses. For example, FIG. 5 shows an ultra-wideband (UWB) demodulator that is included within a UWB receiver 200. This arrangement is also illustrated in FIGS. 7, 11, 12, 13 and 14.

Referring now to FIGS. 16–29, and discussed below, a preferred method to modulate data onto, or demodulate data from, UWB pulses or narrowband sine wave signals employs programmable electromagnetic pulse generator/sampling circuit(s). One or more of these circuits may be employed in the modulators/demodulators described above.

In one embodiment of this aspect of the invention, the electronic circuit may be employed as a software definable radio receiver. In this embodiment, a software controllable sampler samples an electronic communication signal at extremely short time intervals. The samples may then be combined to form a received communication signal. One feature of this circuit is that it may provide demodulation and data recovery of a wide range of communication signals, such as conventional sine wave signals, as well as ultra-wideband pulses. Alternatively, the same circuit may be employed as a very fast electromagnetic pulse generator, that can generate either narrowband sine wave signals, or ultra-wideband pulses that are formed or shaped to represent datra-modulated communication signals.

An associated feature of the circuit is that a device employing the present invention may receive one form of communication technology (narrowband sine wave signals, for example) and transmit using another form of communication technology (ultra-wideband, for example).

Software-defined radio is communication in which electromagnetic pulses, or conventional, narrowand sine waveforms are generated, modulated, and decoded only by computer software. This allows a single computer-controlled receiver, transmitter or transceiver to interface and operate with a variety of communication services that use different frequencies, modulation methods and/or protocols. Changing the frequency, modulation method and/or protocol only requires using a different computer software program. Thus, software-defined radio is much more economical to manufacture, package, and produce.

One feature of this aspect of the present invention is that a group of short duration pulses of electromagnetic energy can be aggregated, or "stacked-up" to form a conventional, narrowband radio frequency signal. A communication signal sampling theorem states that a signal must be sampled at twice the highest frequency component to be reliably recovered. This signal sampling theorem is generally known as either the Nyquist sampling theorem or the Shannon sampling theorem.

One corollary of this sampling theorem is that electromagnetic pulse generation systems can be used to represent, or simulate, continuous waveform signals if the time resolution, or duration of the pulses is such that the inverse of resolution is at least twice the highest frequency component in the desired waveform. For example, to aggregate a pulsed signal to represent cellular communications at 900 MHz would require at a minimum a 555 pico-second pulse duration. To replicate a 802.11(a) (i.e., BLUETOOTH) waveform would require pulse durations of 100 pico-seconds or less since the center frequency assigned to that communications technology is approximately 5 GHz. Additionally, to represent some conventional signal modulation techniques, the amplitude of the carrier waveform must also be reliably constructed. Therefore, re-creation, or simulation, of an amplitude modulated waveform may require the capability to produce extremely short duration pulses while controlling the amplitude of the pulses.

As discussed above in connection with FIGS. 4–15, the present invention may comprise a single mobile, or fixed, wireless, or wire-connected device that can switch between various wireless, or wire communication technologies and standards. By way of example and not limitation, a device constructed according to the present invention may "bridge" or communicate with BLUETOOTH, WiFi, UWB, CDMA, GSM, PCS and a host of other communication technologies by employing a software-defined radio. One feature of the present invention is the generation and aggregation of extremely short duration electromagnetic pulses into waveforms that simulate a wide range of wireless communication technologies.

As illustrated in FIGS. 16–29, one feature of the present invention is that it allows a computer software control unit to select appropriate electromagnetic pulse generation cells in such a way as to generate a carrier signal that is already modulated to reflect the desired data to be sent. This can reduce the complexity and expense of communication device design in that modulation hardware is no longer necessary to impart data onto the carrier signal.

An additional feature of the present invention is that it may act as a "bridge" between different communication technologies, as discussed above. By way of example and not limitation, a narrowband PCS signal may be received at a frequency of approximately 1.9 GHz. A communication device employing the present invention may re-transmit the PCS signal by transmitting a 900 MHz signal that conforms with a CDMA communication system. Alternatively, the re-transmission may employ a UWB wireless link using UWB communication methods described above. The UWB wireless link may transmit across a frequency band extending from about 3.1 GHz to about 10.6 GHz.

Referring to FIGS. 16–20, the electromagnetic pulse generation cell(s) employed in the present invention may have one, or more software controllable interfaces. In one embodiment, the software control interface employs at least one digital to analog conversion (DAC) circuit. In this embodiment, a DAC may be used to provide the control signal of the pulse generation cell(s). Alternatively, a DAC may be used to deactivate a switch placed inline with the current source of each pulse generation cell effectively shutting down unused pulse generation cell(s). Alternatively, a DAC may be used by a software control unit to control the flow of data to the input stage of each pulse generation cell. A still further use of a software controlled DAC would provide control signals to the aggregation or combining circuit that combines the output of serial and/or parallel arrays of pulse generation cells. Additionally a DAC may be used to provide threshold voltage levels in the pulse generation cell(s).

In another embodiment of the present invention, a computer microprocessor or alternatively a finite state machine, may send signals directly to the above mentioned inputs without the use of DAC hardware. A finite state machine is any device that stores the status of something at a given time and can operate on input to change the status and/or cause an action or output to take place for any given change. Thus, at any given moment in time, a computer system can be seen as a set of states and each program in it as a finite state machine. For example, a finite state machine may be a hardware implementation of computer logic, or software.

Figure 21:
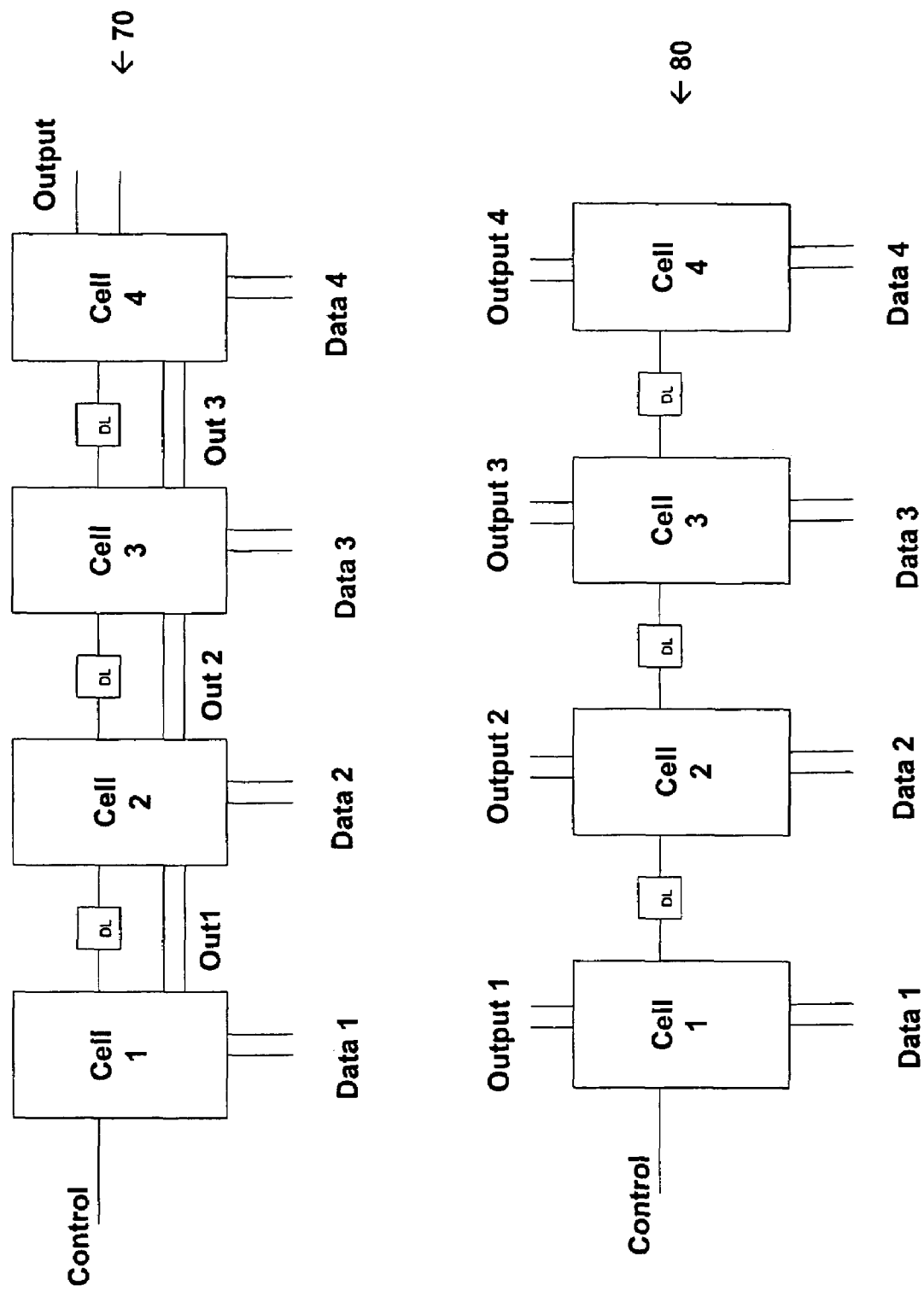
FIG. 21 illustrates a schematic diagram of two series-connected arrays of pulse generation/signal sampler cells constructed according to one embodiment of the present invention.

Referring to FIG. 21, as conceived herein, electromagnetic pulse generation cells may be configured in a number of ways. In one embodiment, pulse generation cells are connected in series, relative to the control input, with a single set of output terminals to form a Serial Array Single Output (SASO). In this embodiment delay lines ("DL" boxes with connecting lines) may be used to set the time of pulse generation of each cell relative to the first cell's output. Generally, a delay line is a device that introduces a time lag in a signal. The time lag is usually calculated as the time required for the signal to pass though the delay line device, minus the time necessary for the signal to traverse the same distance without the delay line.

In this configuration, a transition in a control signal generates a pulse proportional to the data input on the first cell. The control signal then passes through a delay line to a second cell and causes a pulse to be generated in the output proportional to the data input on the second cell. The second pulse is delayed in time relative to the first by the delay in the control signal. Subsequent stages in the SASO can be further delayed providing pulse outputs at their appropriate time interval. This configuration may be used without delay lines causing the pulses produced by each individual cell to be summed at the output terminals.

Figure 29:
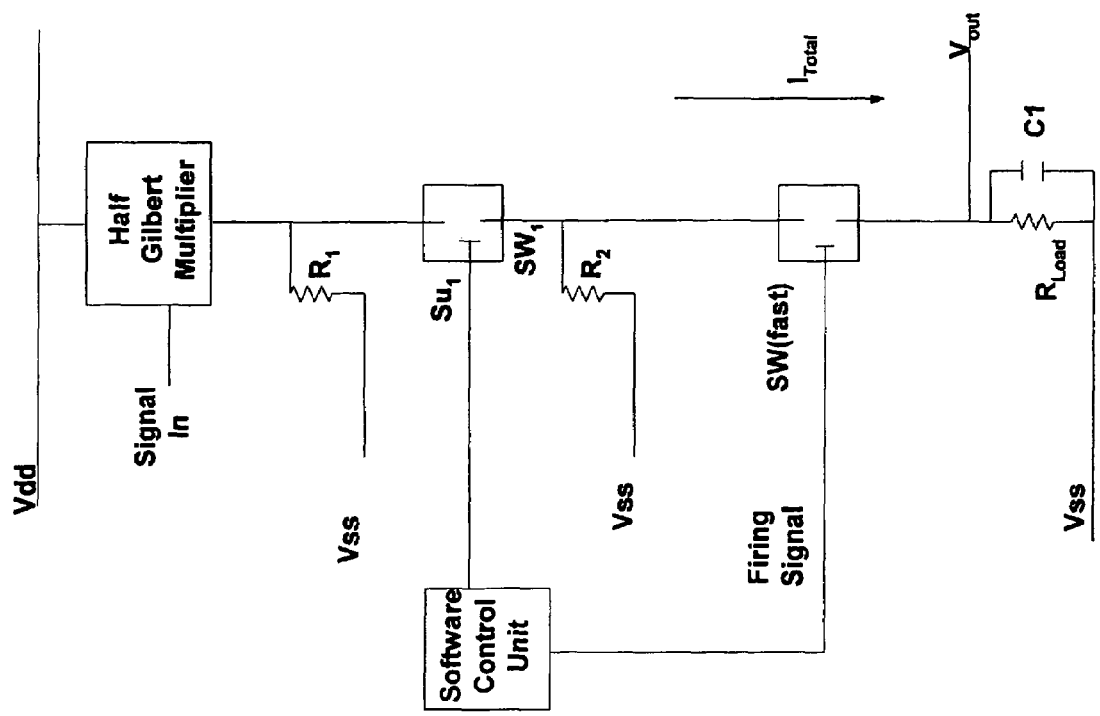
FIG. 29 illustrates an electronic sampling circuit constructed according to one embodiment of the present invention.

Referring again to FIG. 21, in another configuration of pulse generation cells involves connecting in series, relative to the control input, a number of cells where each cell has output terminals. In this configuration, a serial input multiple output (SAMO), can be implemented with or without delay lines to provide simultaneous outputs or outputs that are temporally spaced due to the delay in the control transition. In this configuration, the outputs may be summed at a common node, or provided to a mixing circuit such as a Gilbert Multiplier, or a Half Gilbert Multiplier (as shown in FIG. 29), and the product is then taken.

Figure 22:
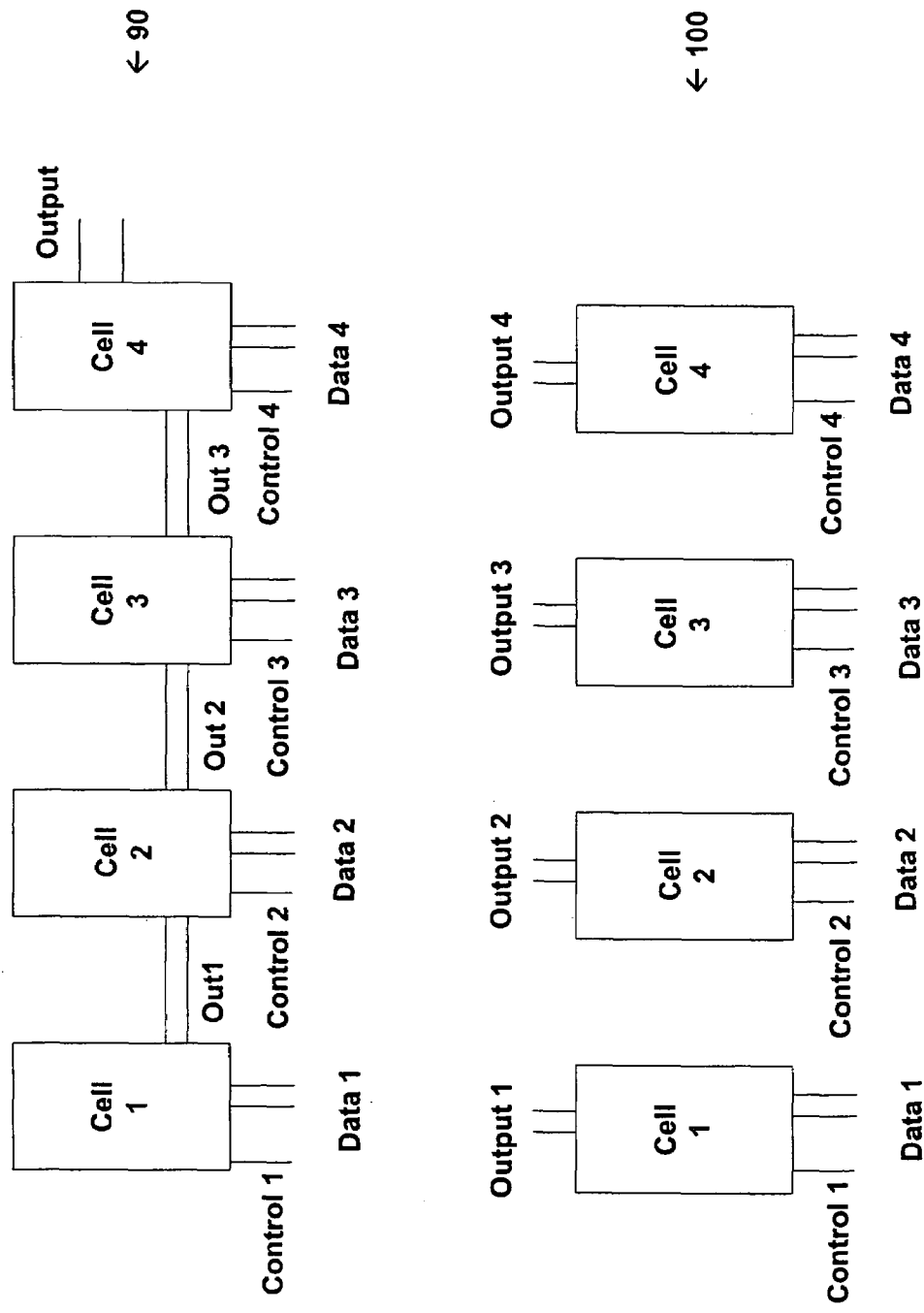
FIG. 22 illustrates a schematic diagram of a two parallel-connected arrays of pulse generation/signal sampler cells constructed according to another embodiment of the present invention.

Referring to FIG. 22, in a still further configuration, a combination of electromagnetic pulse generation cells may be connected in parallel, relative to the control inputs. In this configuration, each pulse generation cell may receive a different control signal. In this configuration, the timing of the control inputs can directly control generation and temporal spacing of the pulses. The cells may be configured to have a single output (PASO) or multiple outputs (PAMO).

In another configuration, two-dimensional arrays of SASO, SAMO, PASO, and PAMO arrays may be connected serially or in parallel to provide additional functionality.

In conventional communication technologies a carrier waveform is generated then data is modulated onto the waveform. For example, most conventional systems use a local oscillator to provide a sine wave carrier, and then data is modulated onto the carrier, or waveform. In some forms of ultra-wideband communications, a pulse is generated then filtered or mixed to achieve a desired center frequency. In one embodiment of the present invention, the pulse generation cells are configured to produce waveforms at the desired center frequency, and are also configured to represent data in its modulated form. This reduces the complexity and expense of the transmitter design by eliminating modulation and mixing hardware and potentially eliminating the need for bandpass filters.

By controlling the shape of a generated waveform to the tens of picoseconds, it is possible to limit the frequency content of the resultant waveform. One feature of the present invention provides a waveform generator for electronic communication systems that complies with FCC emission limit regulations without employing bandpass filters to reject out-of-band emissions.

Another feature of the present invention provides a waveform generator that may be software controlled to produce ultra-wideband (UWB) pulses compliant with both single-band and multi-band UWB systems. Current Federal Communications Commission (FCC) regulations establish "spectrum masks" that limit outdoor ultra-wideband emissions to −41 dBm between 3.1 GHz and 10.6 GHz. A single-band ultra-wideband (UWB) communication system may emit UWB pulses having a frequency spread that would extend from about 3.1 GHz to about 10.6 GHz. A multi-band UWB communication system may break-up the available frequency and emit UWB pulses in discrete frequency bands, for example, 200 MHz bands, 400 MHz bands, or 600 MHz bands. It will be appreciated that other frequency band allocations may be employed. An example of a possible multi-band UWB communication system is illustrated in FIG. 10.

Additionally, the present invention allows a communication device to bridge, or convert data received from a single-band UWB communication system to a multi-band communication system and vice-versa, as well as bridging data between conventional carrier wave communication technologies as described above, and UWB communication technologies.

Figure 16:
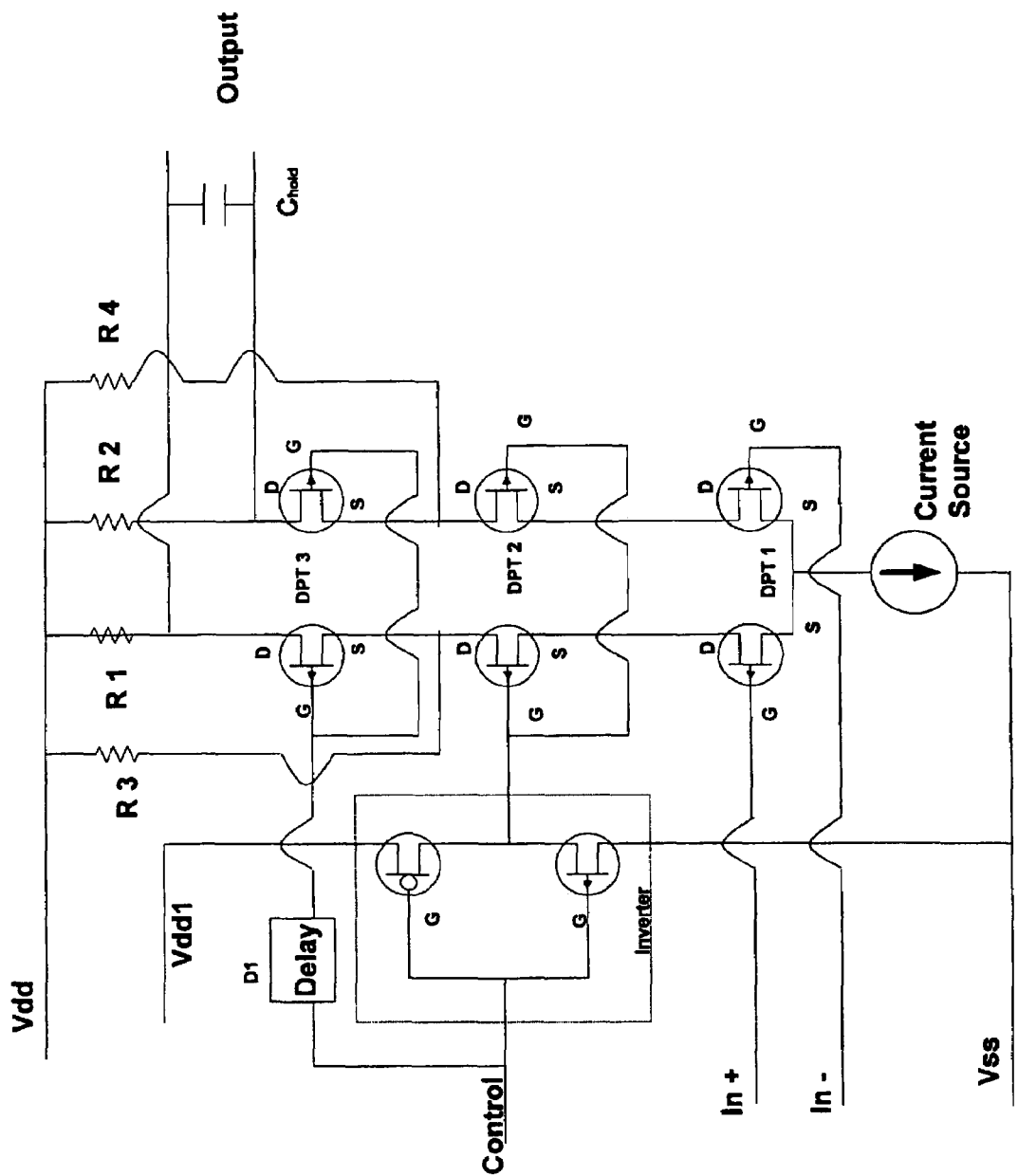
FIG. 16 illustrates a schematic diagram of a programmable pulse generator/signal sampler constructed according to one embodiment of the present invention.

Referring now to FIG. 16, an electromagnetic pulse generation cell constructed according to one embodiment of the present invention is illustrated. This electromagnetic pulse generation cell, as well as the other embodiment electromagnetic pulse generation cells described herein, may be employed as extremely fast electromagnetic sampling cells, or circuits as well. For example, a signal to be sampled is superimposed on the inputs to the first differentially paired transistors (DPTs), described below. When the circuit, or cell, is in the active mode (that is, when the DPTs are in the triode region between on and off) the output pulse is proportional to the signal present on the inputs. In this manner these circuits, or cells, are capable of sampling an incoming electromagnetic signal at a time resolution equivalent to the pulse generation aperture.

For example, as discussed above, a number of communications systems employ some form of signal amplitude modulation (AM). There are various approaches to demodulate AM signals. In one approach, an AM signal is mixed with a carrier at the same frequency. The AM signal can be represented by y(t)=m(t)cos($\omega_c$t), where m(t) is the data present on carrier cos($\omega_c$). Mixing this signal with a carrier at ($\omega_c$), yields the following:

$$x(t) = y(t)\cos(\omega_c t)$$
$$x(t) = m(t)\cos(\omega_c t)\cos(\omega_c t)$$
$$x(t) = m(t)\cos^2(\omega_c t)$$
$$x(t) = \frac{1}{2}m(t) + \frac{1}{2}\cos(2\omega_c t)$$

The resultant signal is then filtered with a lowpass filter that recovers the $$\frac{1}{2}m(t)$$

component of the signal. Another demodulation method employs an envelope detector and an analog to digital converter.

In contrast, the present invention uses extremely fast sampling cells, as described below, whose output is proportional to the amplitude of the signal received. Direct demodulation of AM signals is therefore possible without the use of mixers or envelope detectors that are traditionally used. In a preferred embodiment of the present invention, these sampling cells would be employed in the UWB demodulator that is part of the UWB receiver 200, shown in FIGS. 5, 7, 11, 12, 13, and 14.

Similarly, in frequency modulated (FM) and phase modulated communications systems the data is carried in the instantaneous frequency of the signal. Demodulation of these two types of signals is similar in nature. Demodulation of FM is usually accomplished using a phase locked loop (PLL) circuit and mixing circuits. The present invention, sampling at extremely fast rates, can detect variations in phase and frequency directly from the output of the sampling cells by a mathematical combining circuit. In a preferred embodiment of the present invention, these sampling cells would be employed in the UWB demodulator that is part of the UWB receiver 200, shown in FIGS. 5, 7, 11, 12, 13, and 14.

Referring now to FIG. 16, an electromagnetic pulse generation, or sampling cell constructed according to one embodiment of the present invention is illustrated. One or more of these cells may be employed by the UWB modulators and UWB demodulators that are part of the UWB transmitters 100, and UWB receivers 200, respectively, that are shown in FIGS. 4–15.

As shown in FIG. 16, data of interest is input to the gate terminals (G) of the differential input stage DPT 1. DPT 1 has its source terminals (S) connected to the current source. The drain terminals (D) of DPT 1 are connected to the source terminals (S) of DPT 2. The gate terminals (G) of DPT 2 are connected to the output of the Inverter. The Inverter may be a phase inverter, a digital inverter, or any other suitable inverter.

The drain terminals (D) of DPT 2 are connected to the source terminals (S) of DPT 3. The gate terminals (G) of DPT 3 are connected to the output of a delay element D1. As discussed above, the delay element is a device that introduces a time lag in a signal. The time lag is usually calculated as the time required for the signal to pass though the delay line device, minus the time necessary for the signal to traverse the same distance without the delay element.

The drain terminals (D) of DPT 3 are connected to resistive elements R1 and R2. Resistive elements R3 and R4 are connected to a voltage source such as Vdd and to the source terminals (S) of DPT 3.

A Control signal is connected to the input of delay D1 and to the input of the Inverter. The power and ground connections of the Inverter can be connected to Vdd1 and Vss respectively, or alternatively to other voltage potentials not shown. All of the signals may be software controlled by the use of a software control unit (not shown), and/or optional digital to analog converters (DACs) (not shown). DAC circuits may comprise multi-bit DAC circuits or alternatively be replaced by voltage divider circuits configured to provide specific voltage levels used by the pulse generation/signal sampling cell.

The Control may comprise a software control unit (SCU) or one or more DACs, and generate the control signals. The delay element D1 is calculated to delay the Control signal from reaching the gate terminals (G) of DPT 3 until the output of the Inverter reaches the gate terminals (G) of DPT 2. Alternatively, the Inverter may be connected to a voltage level distinct from Vdd1.

The function of resistive elements R3 and R4 is to provide appropriate biasing to the circuit. For example, as is generally known, biasing is used to establish a predetermined threshold or operating point. Other methods of biasing are known in the art and may be used to provide this function.

The operation of the electromagnetic pulse generation/signal sampling cell illustrated in FIG. 16 will now be explained. When Control is at a low voltage level, DPT 3 is turned "off" and the output of the Inverter turns "on" DPT 2. When Control is at a high voltage level, DPT 3 is turned "on" and the output of the Inverter turns "off" DPT 2. During the transition of Control from a first voltage level to a second voltage level, both DPT 3 and DPT 2 allow current to flow. Because the amount of current is dependent on the voltage levels at the input terminals of DPT 1, the output signal will be proportional to the voltage present at those terminals.

Figure 17:
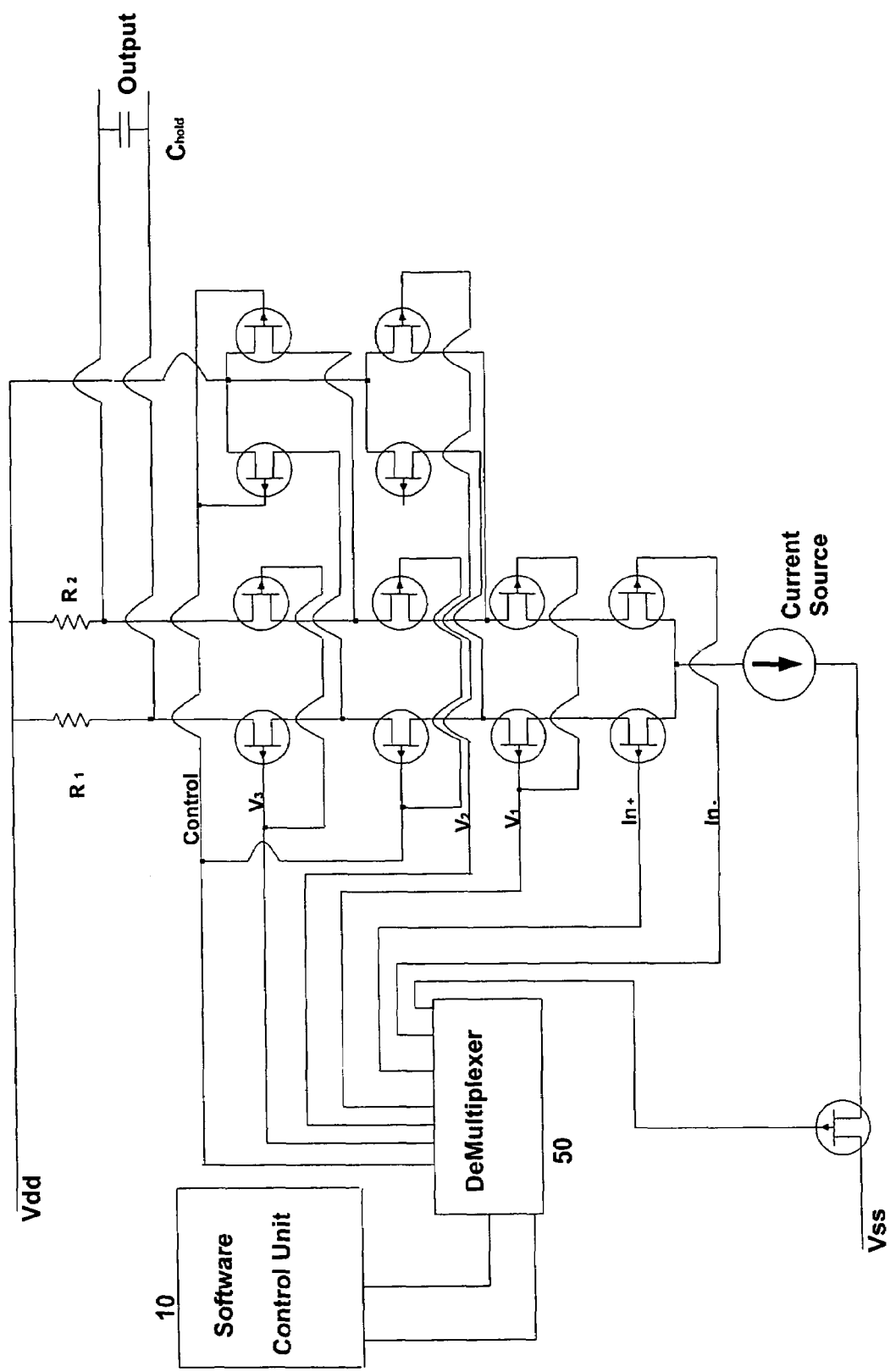
FIG. 17 illustrates a schematic diagram of a programmable pulse generator/signal sampler employing a demultiplexer constructed according to another embodiment of the present invention.

Referring now to FIG. 17, an alternative embodiment electromagnetic pulse generation cell, similar to the cell of FIG. 16 is illustrated. The pulse generation cell of FIG. 17 includes a demultiplexer. Another embodiment of an electromagnetic pulse generation cell may be configured as illustrated in FIG. 17, but may also include the DAC circuits 20(*a*–*g*) illustrated in FIG. 18. The embodiment illustrated in FIG. 17 is essentially constructed as illustrated and described above in connection with FIG. 16, with the exception that all signals from the SCU are sent to demultiplexer 50. Demultiplexer 50 is under the control of software control unit (SCU) 10. Control and data signals are sent to demultiplexer 50 from SCU 10. In this embodiment, the demultiplexer 50 routes the appropriate signals to the different parts of the pulse generation circuit illustrated in FIG. 17.

Figure 18:
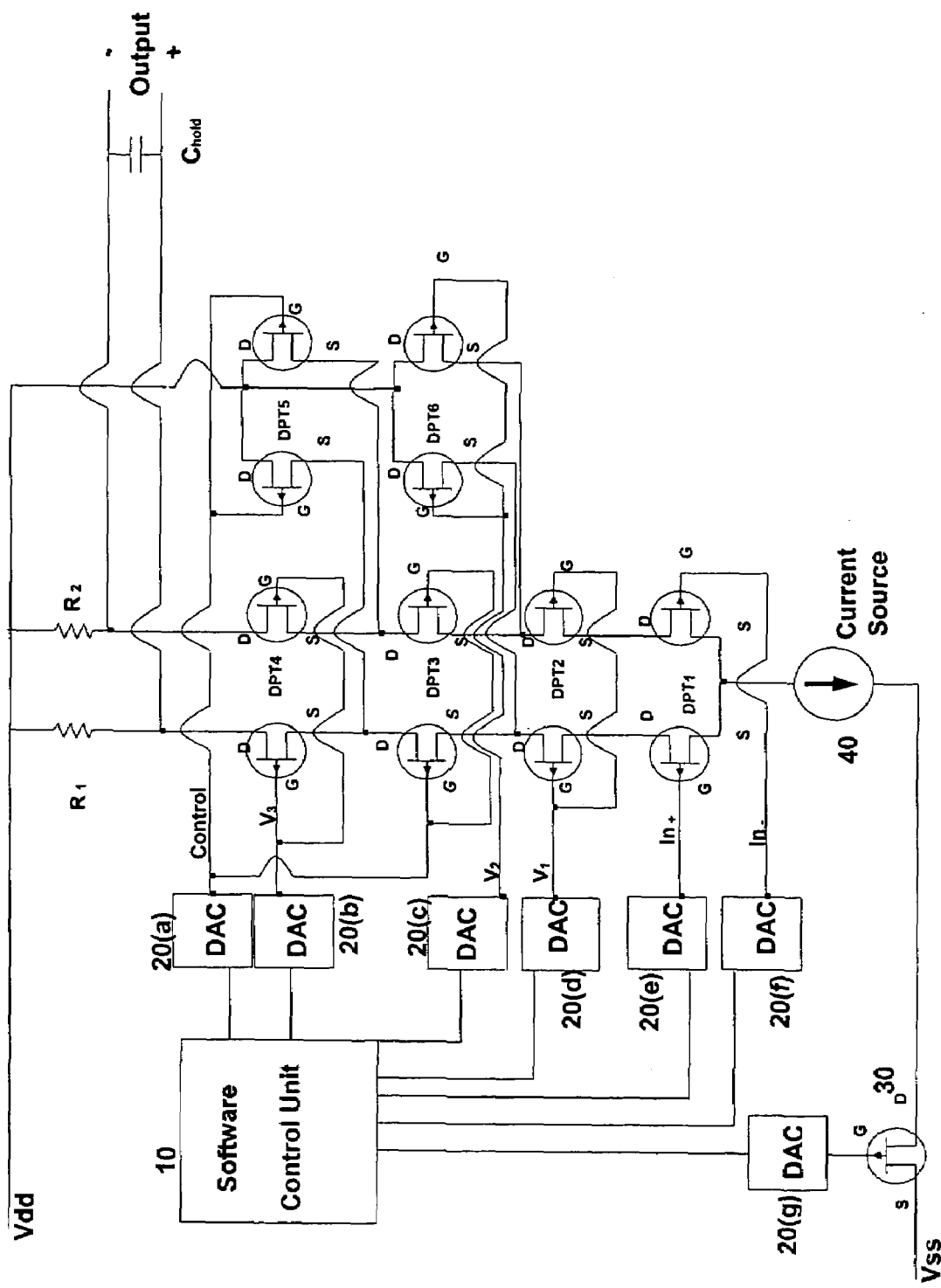
FIG. 18 illustrates a schematic diagram of a programmable pulse generator/signal sampler constructed according to yet another embodiment of the present invention.

Referring now to FIG. 18, a computer software controllable electromagnetic pulse generation/sampling cell is illustrated. Software Control Unit (SCU) 10 is capable of providing a number of control signals to the cell. SCU may comprise a microprocessor or alternatively may comprise a finite state machine capable of providing the necessary digital control signals to the various parts of the pulse generation cell. The SCU 10 may be coupled to a plurality of optional Digital to Analog Control (DAC) circuits 20(a–g). DAC circuits 20(a–g) may comprise multi-bit DAC circuits or alternatively be replaced by voltage divider circuits configured to provide specific voltage levels used by the pulse generation cell. Switching device 30 is under control of the SCU through optional DAC 20(g). Switching device 30 provides the function of shutting down the current source and subsequently the pulse generation cell. The SCU can provide data signals through optional DACs 20(e) and 20(f) as differential input signals to the gate connections of differential pair transistors (DPT) 1.

Current Source 40 provides current through the pulse generation cell. Current Source 40 may comprise any number of common current source configurations including current mirrors. Additionally, Current Source 40 may be mirrored to other pulse generation cells to provide current to those cells. DPT 1 has source terminals (S) connected to Current Source 40. The activation terminal, or gate terminal (G) accepts data inputs from the SCU 10 through optional DACs 20(e) and 20(f). DPT 1 has drain terminals (D) connected to the source terminals (S) of DPT 2. DPT 2 is an optional DPT that can be used to prevent transient voltages and currents from other DPTs from affecting DPT 1.

In the embodiment not employing DPT 2, the drain terminals (D) of DPT 1 are connected directly to the source terminals (S) of DPT 3. In that embodiment, optional DAC 20(d) or another voltage division circuit (not shown) is not used. DPT 3 has gate terminals (G) connected to a control signal that may be provided by SCU 10 through the optional DAC 20(a). In one embodiment, the drain terminals (D) of DPT 3 are connected to the source terminals (S) of DPT 2. In another embodiment, the drain terminals (D) are connected directly to the source terminals (S) of DPT 1. The drain terminals (D) of DPT 3 are connected to the source terminals (S) of DPT 4.

DPT 4 has gate terminals (G) connected to a voltage level $V_3$ that may be provided by SCU 10 through DAC 20(b) or optionally through a voltage divider circuit (not shown). The source terminals (S) of DPT 4 are connected to the drain terminals (D) of DPT 3.

The drain terminals (D) of DPT 4 are connected to a pair of resistive circuit elements R1, R2. Any number of devices may be used to provide a specific resistance in a circuit, or cell such as transistors having a specific output resistance, usually referred to as an active load.

DPT 5 has gate terminals (G) connected to the control signal that may be provided by SCU 10 through optional DAC 20(a). The drain terminals (D) of DPT 5 are connected to voltage source Vdd. The source terminals (S) of DPT 5 are connected to the source terminals (S) of DPT 4 and therefore the drain terminals (D) of DPT 3. DPT 6 has gate terminals (G) connected to voltage V2 which can be provided by SCU 10 through DAC 20(c) or optionally from a voltage division circuit driven by either the SCU 10 or Vdd. In the latter case, the voltage at this point is not software controllable. Resistive circuit elements R1, R2 are connected to voltage source Vdd on one end and to the drain connections of DPT 4 on the other. A differential output is taken from the connection between resistive circuit elements R1, R2 and the drain terminals (D) of DPT 4. An optional energy storage element Chold may be included in the circuit to provide the output signals for a specific hold time.

The operation of the circuit in FIG. 18 is dependent on a number of voltage levels: Control, V1, V2, V3, Vdd, and Vss. The primary function of voltage level V1 is to ensure that optional DPT 2 is in the "on" state. The active pulse generation time period occurs when one, or more of DPTs are in transition from one fixed state to another fixed state. For example, a transition from "off" to "on" provides an active time period for pulse generation as does the transition from "off" to "on". If it is desirable to produce pulses in only one transition time, the output of the cell may be forced into a steady state by providing a signal from the SCU through optional DAC 20(g) to switching element 30 interrupting the flow of current through Current Source 40. Alternatively, the data inputs at DPT 1 can be set to zero volts. A still further method of shutting down the cell would involve the SCU providing a signal through DAC 20(d) causing optional DPT 2 to turn off, thus isolating the input data signals at DPT 1 from the output terminals of the cell.

The electromagnetic pulse generation/sampling cell of FIG. 18 has three states of operation. In the first state, Control is at a voltage level higher than V3 plus the voltage drop across DPT 5 when on. In this state, DPT 5 is in the "on" state. Since the drain terminals (D) of DPT 5 are connected to Vdd, this DPT in the "on" state will create a lower voltage in DPTs source terminals (S). Since the voltage of Control minus the voltage drop across DPT 5 is still greater than voltage level V3, DPT 4 is still in the "off" state. With no current flowing through DPT 4, the voltage at the output terminals of the pulse generation cell will be Vdd.

In the third state of operation the voltage level of Control is lower than voltage level V2, which causes DPT 6 to be "on". Since the source terminals (S) of DPT 6 are connected to the source terminals (S) of DPT 3, DPT 3 will have a higher voltage level at its source terminals (S) than at its gate terminals (G) and be in an "off" state. Like the first state, current flow across the resistive elements R1, R2 is interrupted and the output voltage will be approximately Vdd.

In the transition between the first and third states the pulse generation cell becomes active. When the control voltage is at an active switching level, DPT's 4, 5, 6, and 7 begin to transition from either an "on" state to an "off" state or from an "off" state to an "on" state. During this transition time period DPT 3 and DPT 4 allow current to flow across resistive elements R1, R2. The current flow causes a voltage drop from Vdd to be present at the differential output terminals. Since the amount of current through DPT 1 is dependent on the voltage level at the gate terminals (G) of DPT 1, the output signal will be proportional to the voltage level provided by the SCU through optional DACs 20(e) and 20(f). In this manner, electromagnetic pulse amplitude variation is software controllable by the SCU.

As the Control voltage reaches a deactivation switching point between V2 and V3, the circuit enters state 3, and the output terminals return to a steady state of approximately Vdd. Additionally, the amount of time that it takes Control to transition from the first switching point to the second is dependant on the specific voltage levels. The time duration of the active region can be controlled by setting V2 and V3 at different levels. Therefore, electromagnetic pulse width, or duration is also software controllable by the SCU.

Figure 19:
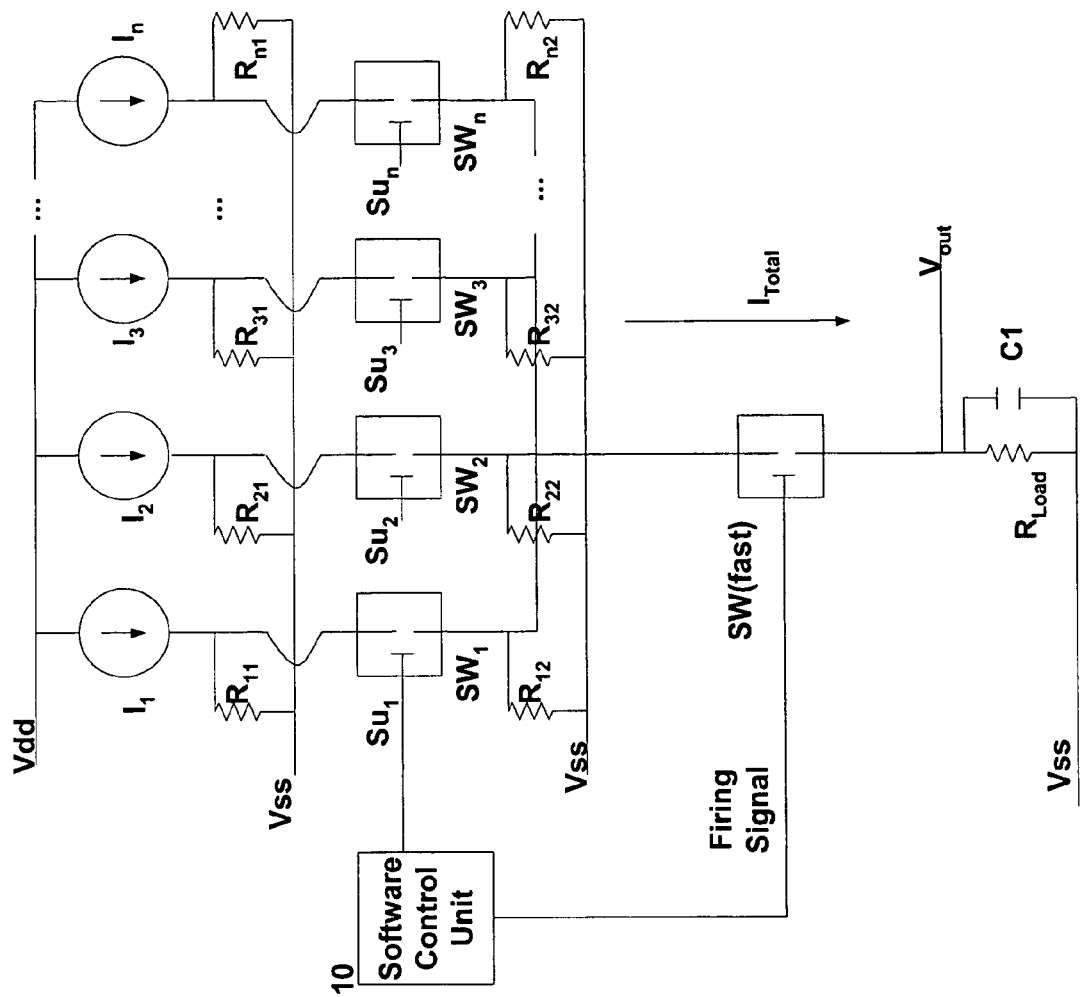
FIG. 19 illustrates a schematic diagram of a programmable pulse generator/signal sampler constructed according to another embodiment of the present invention.
Figure 20:
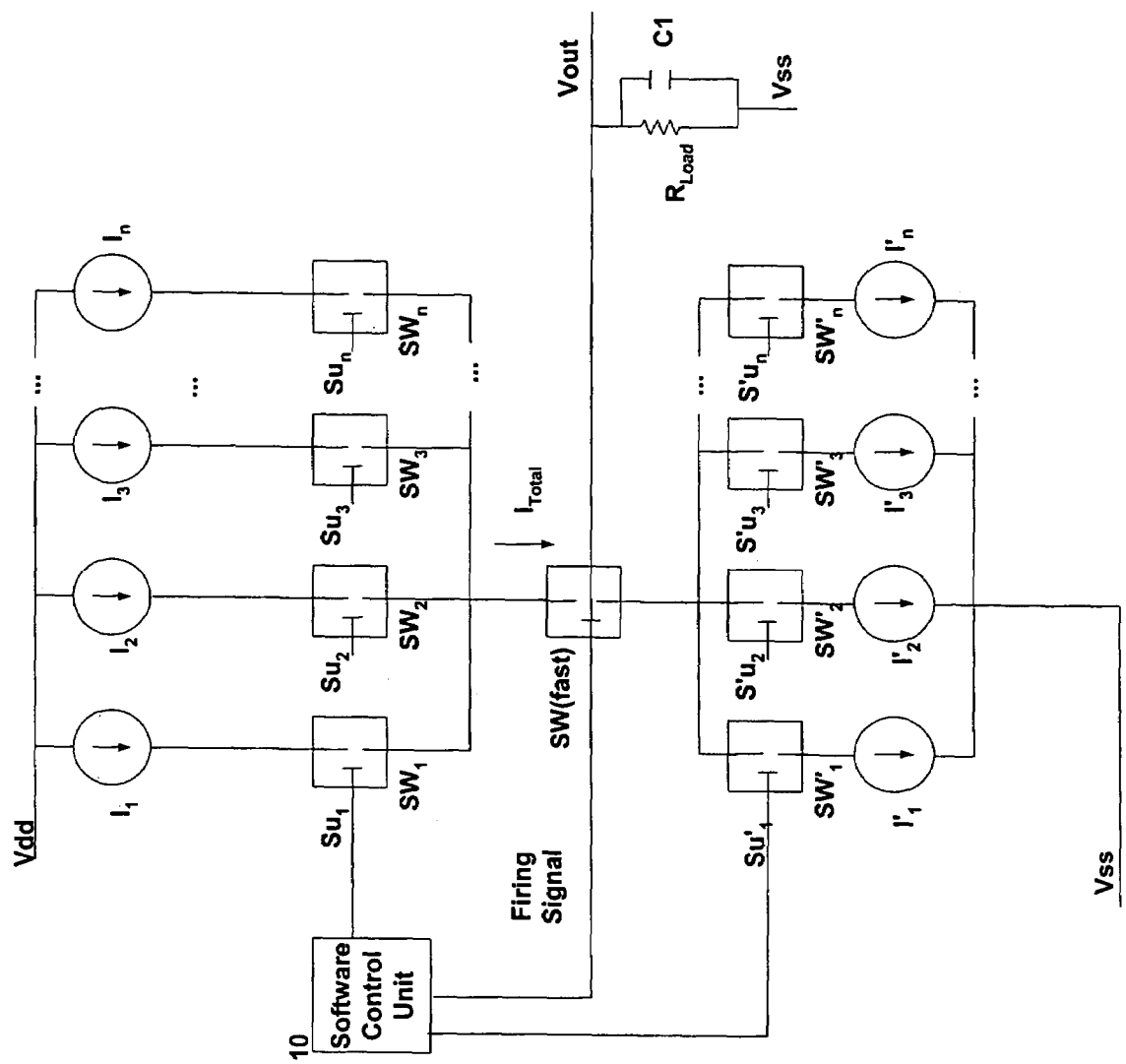
FIG. 20 illustrates a schematic diagram of a programmable pulse generator/signal sampler constructed according to a further embodiment of the present invention.

Referring now to FIGS. 19 and 20, electromagnetic pulse generation/sampling cells constructed according to other embodiments of the present invention are illustrated. In one embodiment of this architecture, shown in FIG. 19, a plurality of current sources $I_1$ through $I_n$ provide current through resistive elements $R_{11}$ through $R_{n1}$ when switches $SW_1$ through $SW_n$ are in the open position. This mode of operation ensures that the current sources $I_1$ through $I_n$ remain turned-on prior to selection by software control unit (SCU) 10. SCU 10 is capable of providing a number of control signals to the cell. SCU 10 may comprise a microprocessor or alternatively may comprise a finite state machine capable of providing the necessary digital control signals to the various parts of the pulse generation/sampling cells illustrated in FIGS. 19 and 20.

SCU 10 provides set-up signals SU1 through SUn to switches $SW_1$ through $SW_n$. Switches $SW_1$ through $SW_n$ are in either an open or a closed state depending on the set-up signals SU1 through SUn. Once selected $R_{12}$ through $R_{n2}$ provide a path for currents $I_1$ through $I_n$ prior to the Firing Signal becoming active. In this state, SCU 10 has selected which currents $I_1$ through $I_n$ will pass through high-speed switch $SW_{(fast)}$ when the Firing Signal is activated. Once the Firing Signal is activated by SCU 10, the $I_{total}$, the sum of the selected currents $I_1$ through $I_n$, conducts through high-speed switch $SW_{(fast)}$ and develops a change in voltage $V_{out}$.

In the electromagnetic pulse generation/sampling cell illustrated in FIG. 19, the current sources $I_1$ through $I_n$ are mirror currents of a master current source. These mirror currents may be precisely controlled to be near duplicates of the master current source (not shown). Alternatively, a number of known techniques may be employed to divide or multiply the master current source (not shown) to obtain other current values. A number of devices may be used as selection switches, and include transistors, differential paired transistors (DPTs), and other suitable devices.

High-speed switch $SW_{(fast)}$ may only allow current to pass when two or more switching elements, such as transistors, are in the triode region, and prevent current flow when at least one of the switching elements is saturated, or in an off state.

For example, when an inverter comprising at least two transistors is used for high-speed switch $SW_{(fast)}$, the switch $SW_{(fast)}$ is in steady-state when one transistor is off and the other is on. The triode region (when both transistors are between on and off) that occurs when the transistors switch states provides a path for current flow. Specifically, the triode state occurs between when the first transistor is on and the second transistor is off, to when the first transistor is off and the second transistor is on. This triode region, between when the transistors switch states, provides a path for current flow.

In the first state, $V_{out}$ would approximate $V_{ss}$ since no current is flowing across the load. Likewise in the second state $V_{out}$ approximates $V_{ss}$ for the same reason. When $SW_{(fast)}$ is switching states, current is allowed to flow across the load and an electromagnetic pulse is produced.

In an alternate embodiment of this extremely short duration electromagnetic pulse generation/sampling architecture, shown in FIG. 20, source currents $I_1$ through $I_n$, are duplicated as sink currents $I'_1$ through $I'_n$. Additionally, switches $SW_1$ through $SW_n$ are duplicated in the sink channel as $SW'_1$ through $SW'_n$. In this embodiment, SCU 10 provides set-up signals SU'1 through SU'n to switches $SW'_1$ through $SW'_n$ ensuring the aggregate currents sourced from $I_1$ through $I_n$ are sinked by $I'_1$ through $I'_n$. That is, $I'_1$ through $I'_n$ provide a path to ground for $_1$ through $I_n$.

The high-speed switch $SW_{(fast)}$ can provide a higher impedance path for current when in the open state. When high-speed switch $SW_{(fast)}$ receives a Firing Signal from SCU 10, it changes states and allows $I_{total}$, the sum of currents $I_1$ through $I_n$ to flow to the load $R_{load}$ and $C_1$.

Referring to FIG. 21, electromagnetic pulse generation/signal sampling cells may be configured in a number of ways. Each of cell 1–4 represents any one of the pulse generation/signal sampling cells illustrated in FIGS. 16–20, or alternative embodiments thereof. One or more groups of cells 1–4 may be employed by the UWB modulators and UWB demodulators that are part of the UWB transmitters 100, and UWB receivers 200, respectively, that are shown in FIGS. 4–15. It will be appreciated that any number of pulse generation/signal sampling cells may be employed by the present invention, with the four cells illustrated for drawing expediency.

Again referring to FIG. 21, cell array 70 is a Serial Array Single Output (SASO). In this embodiment, pulse generation cells are connected in series, relative to the control input, with a single set of output terminals. Delay lines (shown as connecting lines and "DL" boxes) may be used to set the time of pulse generation of each cell relative to the first cell's output. Generally, a delay line is a device that introduces a time lag in a signal. The time lag is usually calculated as the time required for the signal to pass though the delay line device, minus the time necessary for the signal to traverse the same distance without the delay line.

In this configuration, a transition in a control signal generates a pulse proportional to the data input on the first cell. The control signal then passes through a delay line to a second cell and causes a pulse to be generated in the output proportional to the data input on the second cell. The second pulse is delayed in time relative to the first by the delay in the control signal. Subsequent stages in the SASO cell array 70 can be further delayed providing pulse outputs at their appropriate time interval. This configuration may be used without delay lines causing the pulses produced by each individual cell to be summed at the output terminals.

Referring again to FIG. 21, cell array 80 is a Serial Input Multiple Output (SAMO). This embodiment comprises connecting the cells 1–4 in series, relative to the control input, where each cell has output terminals (output 1–4). This cell array 80 may be implemented with or without delay lines (shown as connecting lines and "DL" boxes) to provide simultaneous outputs or outputs that are temporally spaced due to the delay in the control transition. In this configuration, the outputs may be summed at a common node, or provided to a mixing circuit such as a Gilbert Multiplier, or a Half Gilbert Multiplier (as shown in FIG. 29), and the product is then taken.

Referring to FIG. 22, two additional configurations of pulse generation/signal sampling cells constructed according to the present invention are illustrated. Each of Cell 1–4 represents any one of the pulse generation/signal sampling cells illustrated in FIGS. 16–20, or alternative embodiments thereof. One or more groups of cells 1–4 may be employed by the UWB modulators and UWB demodulators that are part of the UWB transmitters 100, and UWB receivers 200, respectively, that are shown in FIGS. 4–15. It will be appreciated that any number of pulse generation/signal sampling cells may be employed by the present invention, with the four cells illustrated for drawing expediency.

Again referring to FIG. 22, cell array 90 is a Parallel Array Single Output (PASO). In this configuration, data 1–4 is input into each cell 1–4, and the control inputs 1–4 are individually input into each cell 1–4. The entire cell array 90 is configured to give a single differential output. Alternatively, cell array 100 is a Parallel Array Multiple Output array (PAMO). In this configuration, the control inputs 1–4 are individually input into each cell 1–4, but each cell has an independent output 1–4.

Figure 23:
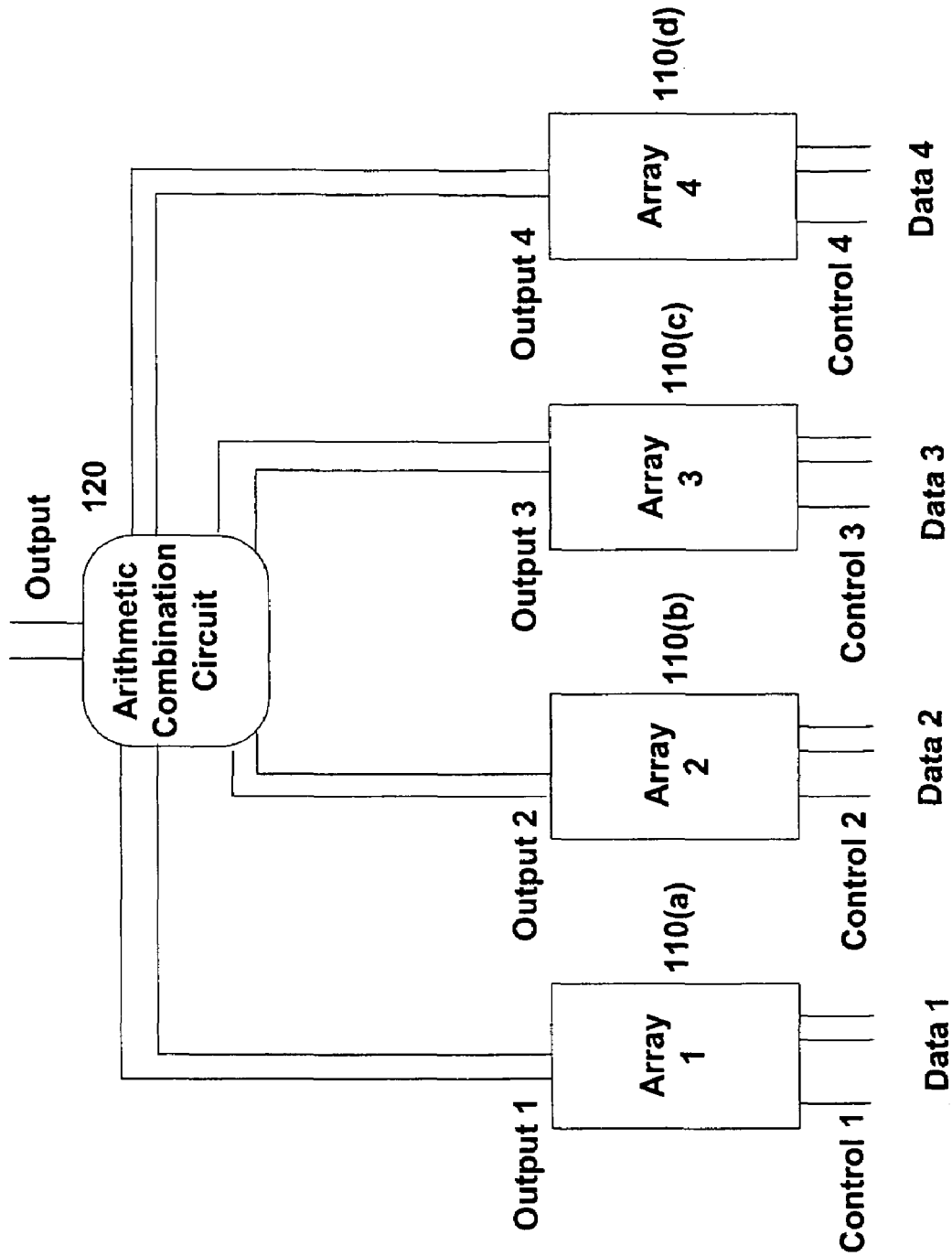
FIG. 23 illustrates a schematic diagram of a parallel-connected pulse generation/signal sampler cell arrays with an arithmetic combining circuit constructed according to one embodiment of the present invention.

Referring to FIG. 23, an arithmetic combination circuit 120 is combined with a group of array elements 1–4. The output from the arithmetic combination circuit 120 may be used to produce any desired electromagnetic waveform.

Thus, the arithmetic combination circuit 120 may be part of the UWB modulator that is included within UWB transmitter 100, shown in FIGS. 4, 6, 8, 9, 10, 13 and 15.

It will be appreciated that any number of array elements may be employed by the present invention, with the four array elements illustrated in FIG. 23, only for drawing expediency. Array elements 110(*a–d*) are connected in parallel to Arithmetic Combination Circuit 120. The Array elements shown may comprise the cell arrays 70, 80, 90 and 100 (SASO, SAMO, PASO, and PAMO) as described above in connection with FIGS. 21–22. Any number of array elements may be used to produce a desired electromagnetic waveform. Data 1–4 is input into the array elements 1–4, and the outputs 1–4 of the array elements 110(*a–d*) are connected to arithmetic combination circuit 120. The arithmetic combination circuit 120 may comprise switching elements, summing circuits, inverting circuits, integrating and differentiating circuits, mixers, multipliers, and other suitable devices. Additionally, the arithmetic combination circuit 120 may be computer software controllable, and may or may not include DAC circuitry.

Figure 24:
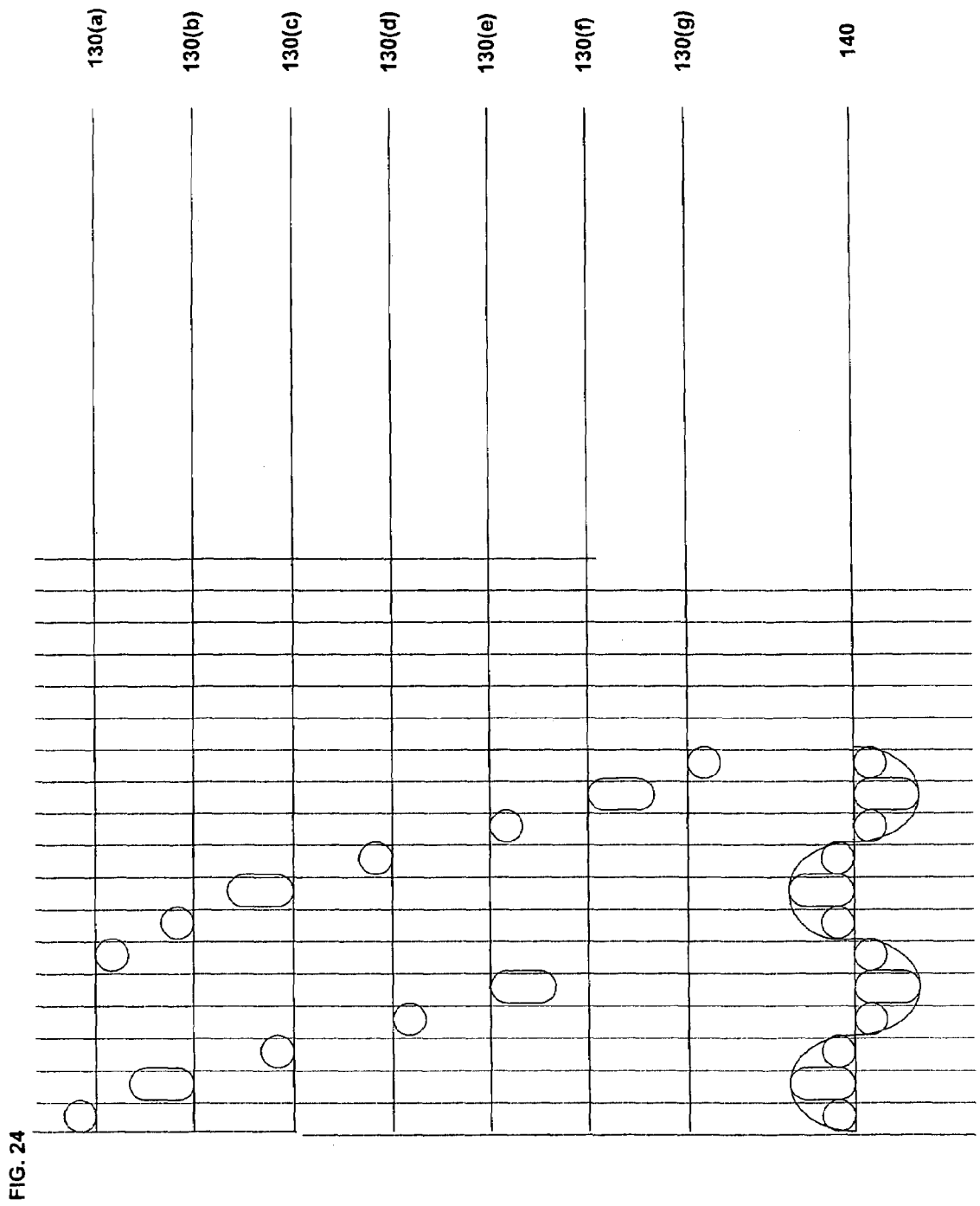
FIG. 24 illustrates one aggregate output of the pulse generation/signal sampler cells and/or arrays of the present invention arranged to form a electromagnetic waveform.

FIG. 24 illustrates an electromagnetic sine wave generated by the arithmetic aggregation of outputs from the cells 1–4 or arrays 1–4. In this example, the cell 1–4 or array 1–4 outputs 130(*a–g*) are summed to produce an electromagnetic sine wave as an output 140. Each output 130(*a–g*), corresponding to the outputs from the cells 1–4 or arrays 1–4, is independently controllable, as discussed above in connection with the operation of the cells 1–4 and array elements 1–4. Thus, any desired waveform, such as waveform 140, shown in FIG. 24, can be produced by the arithmetic combination circuit 120. This functionality can be used to produce a conventional, narrowband sine wave carrier, as part of the bridging communication system of the present invention.

As also shown in FIG. 24, discrete pulses of electromagnetic energy can be output from the plurality of cells 1–4 or arrays 1–4. These individual outputs 103(*a–g*), can be employed individually, or aggregated for use in an ultra-wideband communication system, with discrete pulses ranging from about 1 pico-second to about 1 milli-second in duration. This functionality can be used to produce any type of ultra-wideband pulse, as part of the bridging communication system of the present invention.

Figure 25:
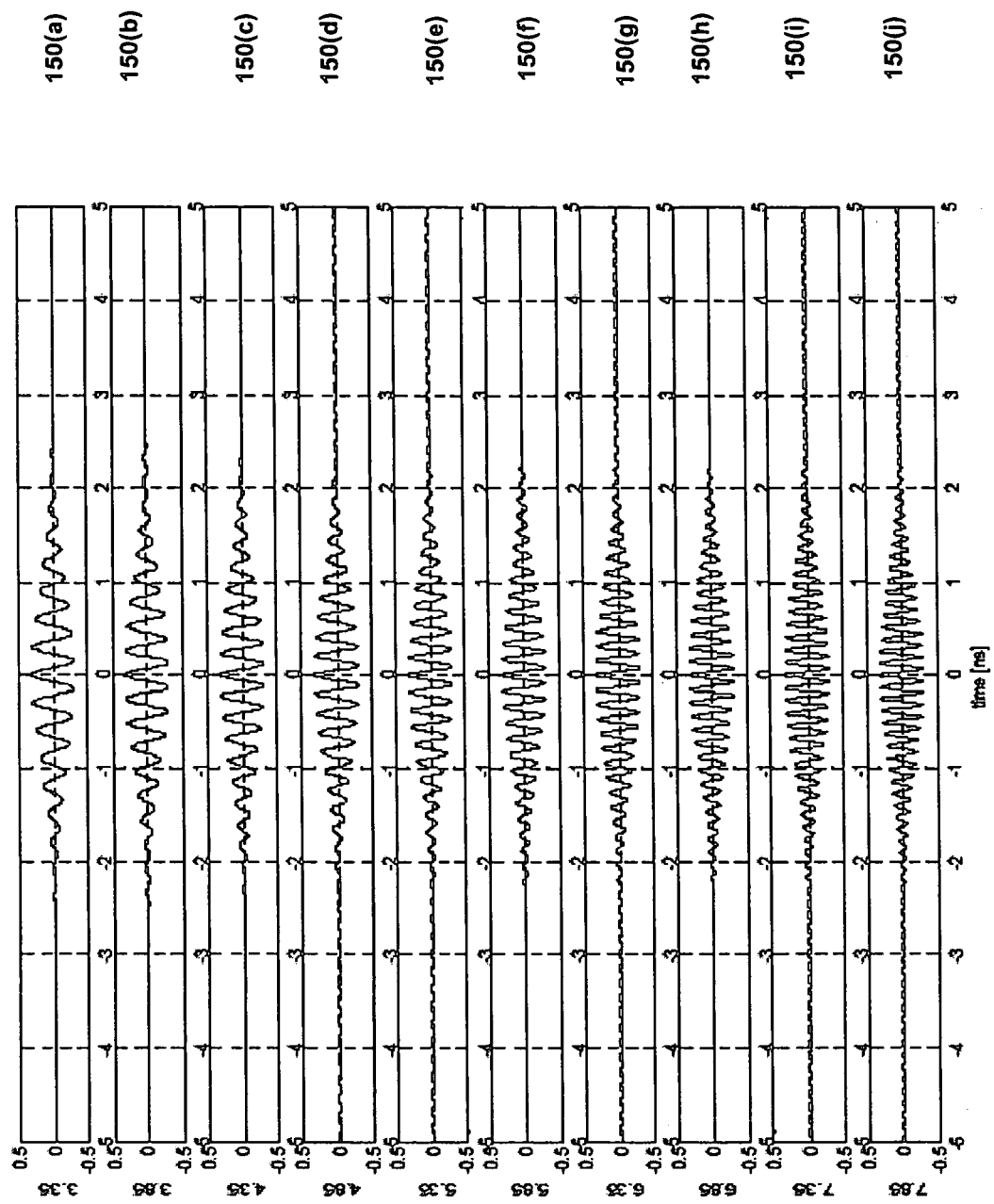
FIG. 25 illustrates different electromagnetic pulses employed in a multi-band ultra-wideband communication system.
Figure 26:
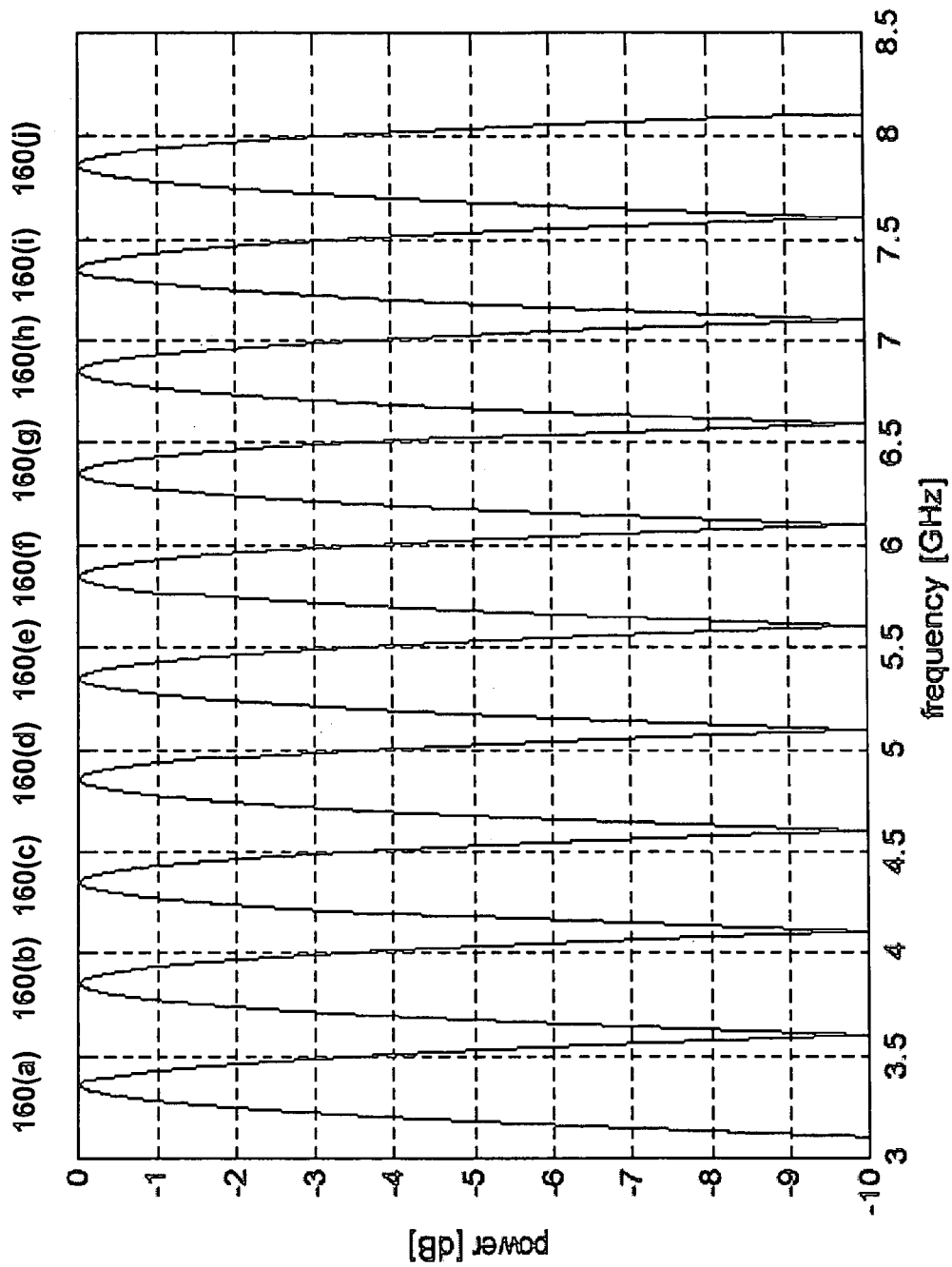
FIG. 26 illustrates the radio frequency spectrum occupied by the electromagnetic pulses in FIG. 25.

FIGS. 25 and 26 illustrate electromagnetic pulses generated by the outputs from one or more cells 1–4 or arrays 1–4. In this example, the cell 1–4 or array 1–4 outputs are in the for a plurality of pulses 150(*a–j*), shown in FIG. 25. Shown in FIG. 26, are the frequency spectra 160(*a–j*) corresponding to each of the pulses 150(*a–j*).

One feature of the present invention is that pulses 150 (*a–j*) having frequency spectra 160 (*a–j*) may be used in a multi-band ultra-wideband (UWB) communication system. For example, multi-band UWB systems usually fall into two architectures. The first architecture generates a electromagnetic pulse with a duration relating to the amount of frequency to be occupied by the band. The UWB pulse is then filtered with a bandpass filter that has a center frequency at the center of the frequency band to be occupied. When transmitted, the resultant pulse will occupy the appropriate amount of frequency around the center of the bandpass filters bandwidth.

A second multi-band UWB communication architecture involves generating a pulse with the appropriate bandwidth and mixing it with a carrier wave of the desired center frequency. The complexity of both architectures is significant.

In one embodiment of the present invention, multi-band UWB pulses are generated directly without the use of mixing circuits and bandpass filters. These pulse streams are generated directly, or are generated by the aggregation of pulse generation cells using the arithmetic combination circuit 120, shown in FIG. 23. Since the electromagnetic waveform generator/sampler herein described is controlled by computer software, it has the ability to quickly switch between single-band UWB communication architectures and multi-band UWB communication architectures by generating pulses with characteristics suitable to each architecture. Additionally, the same electromagnetic waveform generator/sampler may be used to generate a wide range of conventional sine wave signals (140), as shown in FIG. 24.

Figure 27:
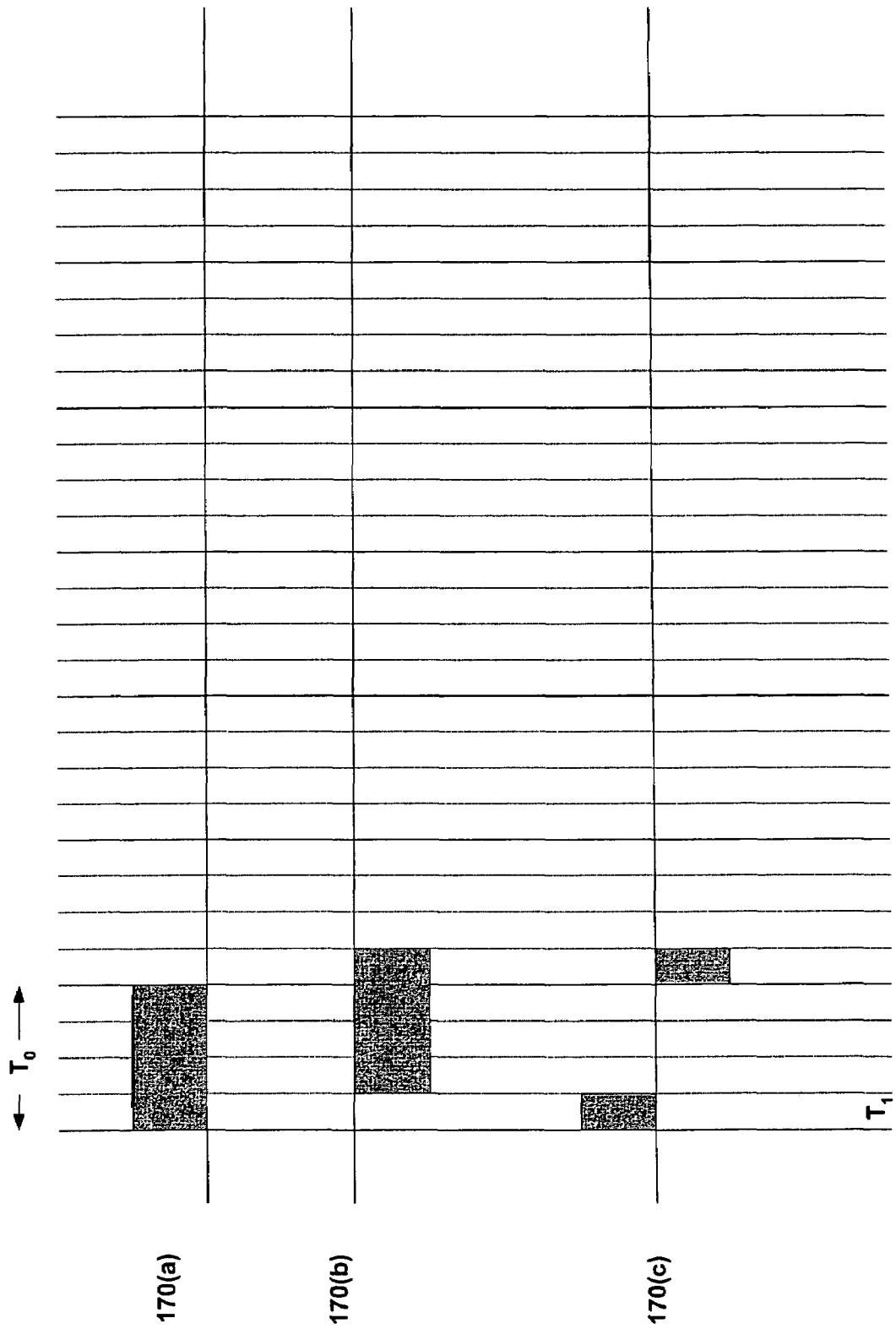
FIG. 27 illustrates different electromagnetic pulses formed by the electromagnetic pulse generation/signal sampler cells and/or arrays of the present invention.

Referring specifically to FIG. 27, in another embodiment of the present invention narrow electromagnetic pulse widths, or durations can be obtained by initially generating pulses 170(*a*) and 170(*b*). The initial pulses 170(*a*) and 170(*b*) may have duration $T_0$. The Arithmetic Combination Circuit 120 (shown in FIG. 23) is used to narrow the resulting pulses to duration $T_1$ by delaying pulse 170(*b*) and by amount $T_1$ and performing an arithmetic function, addition in the case shown, on the two pulses. The resultant pulses 170(*c*) have duration $T_1$. For example, the ultra-fast pulse generation cells herein described are capable of generating pulses with durations of 50 picoseconds or less. With the use of delay lines, pulse 170(*b*) can be delayed by 10 picoseconds relative to pulse 170(*a*). The sum of pulses 170(*a*) and 170(*b*) shown in 170(*c*) would then have a duration of 10 picoseconds. This functionality can be employed by the present invention to produce any desired electromagnetic pulse, or conventional, narrowband sine wave.

Figure 28:
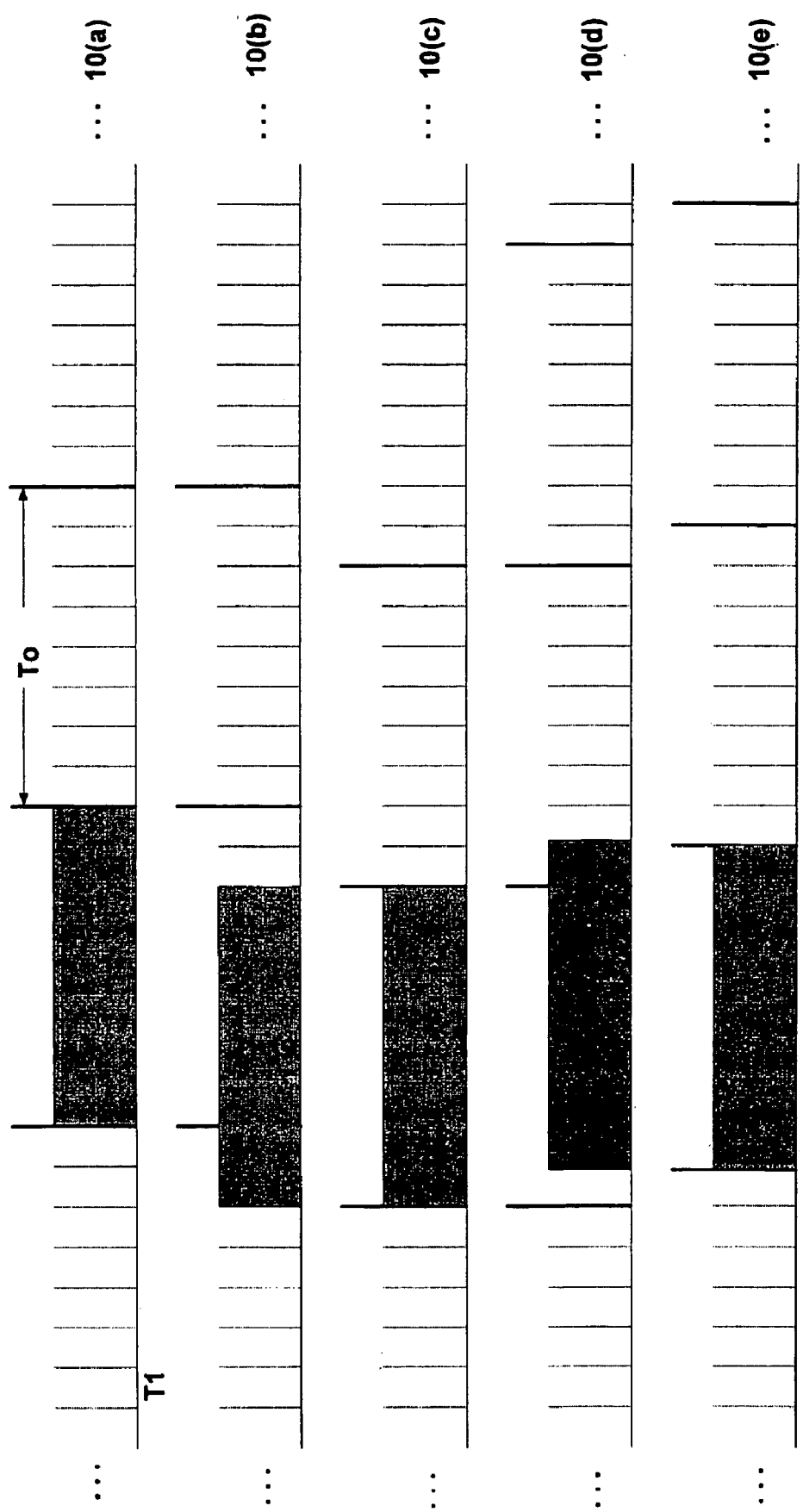
FIG. 28 illustrates drift correction of a master time reference according to one embodiment of the present invention.

Referring to FIG. 28, a method of synchronizing, or correcting a time reference according to one embodiment of the present invention is illustrated. Generally, conventional communication devices require the transmitter and the receiver to synchronize their time references, or master time references. Typically when the receiving device detects a time synchronization sequence, it sets its master time reference to the timing of the synchronization sequence. Since there is relative clock drift between the transmitters master time reference and the receivers master time reference, periodic resynchronization is usually required to ensure reliable data communications and low Bit Error Rates (BER).

In one embodiment of the present invention, extremely fast sampling of received conventional, narrowband signals or ultra-wideband pulses is used to update the receiver's master time reference relative to the transmitter's master time reference. This enables less frequent re-synchronization and can eliminate the need for complex Phase Locked Loop (PLL) circuitry. The reduced need for re-synchronization also lowers overhead in the data stream and therefore increases overall data throughput of the bridged communication system of the present invention.

For example, as shown in FIG. 28, an electromagnetic pulse duration may have a duration of $T_0$, or alternatively, a "time bin" where an electromagnetic pulse may be located may have a duration of $T_0$. An extremely fast sampling array comprised of the cells and circuits described herein may have resolution of $T_1$. With these extremely fast sampling arrays, multiple signal samples may be obtained during time period $T_0$. For example, if the pulse duration is about 4 nano-seconds in duration, a 50 pico-second sampler could obtain 80 samples. As the electromagnetic pulses, or signals are detected at times that deviate from the master time reference of the receiver, the receiver time reference is updated.

As illustrated in FIG. 28, an electromagnetic pulse on line 10(a) arrives at the time the receiver expects. In 10(b) the pulse is delayed by two sampling periods. In 10(c) the receiver adjusts its master time reference from the drift present in 10(b) and the pulse is centered within the time period expected. In 10(d) shows another example of "clock drift," and 10(e) shows a further correction of the receiver master time reference due to the drift in 10(d). Thus, the extremely fast sampling circuits, or cells of the present invention provide a method to correct relative deviations in master time references between transmitter and receiver without the need for resynchronization.

Referring now to FIG. 29, which illustrates an extremely fast sampling circuit according to one embodiment of the present invention. A Half Gilbert Multiplier circuit receives an input signal from a signal source, such as a receiver, antenna, or other suitable device. The Half Gilbert Multiplier multiplies the incoming current by a reference current. This resultant signal is proportional to the input signal to be sampled. Software Control Unit (SCU) sends a signal Su1 to the first switch SW1. Resistors R1 and R2 provide a path for current flow when switches SW1 and SW(fast) are in the open position. When a sample is desired of the incoming signal the SCU sends a Firing Signal to SW(fast), allowing current Itotal to load resistor RLoad and capacitor, or other type of energy storage element C1. Current Itotal, flowing across resistor RLoad and energy storage element C1, produces an output voltage Vout that is proportional to the signal being sampled. Energy storage element C1 additionally holds the value of Vout for a time period defined by (RLoad)(C1).

Figure 30:
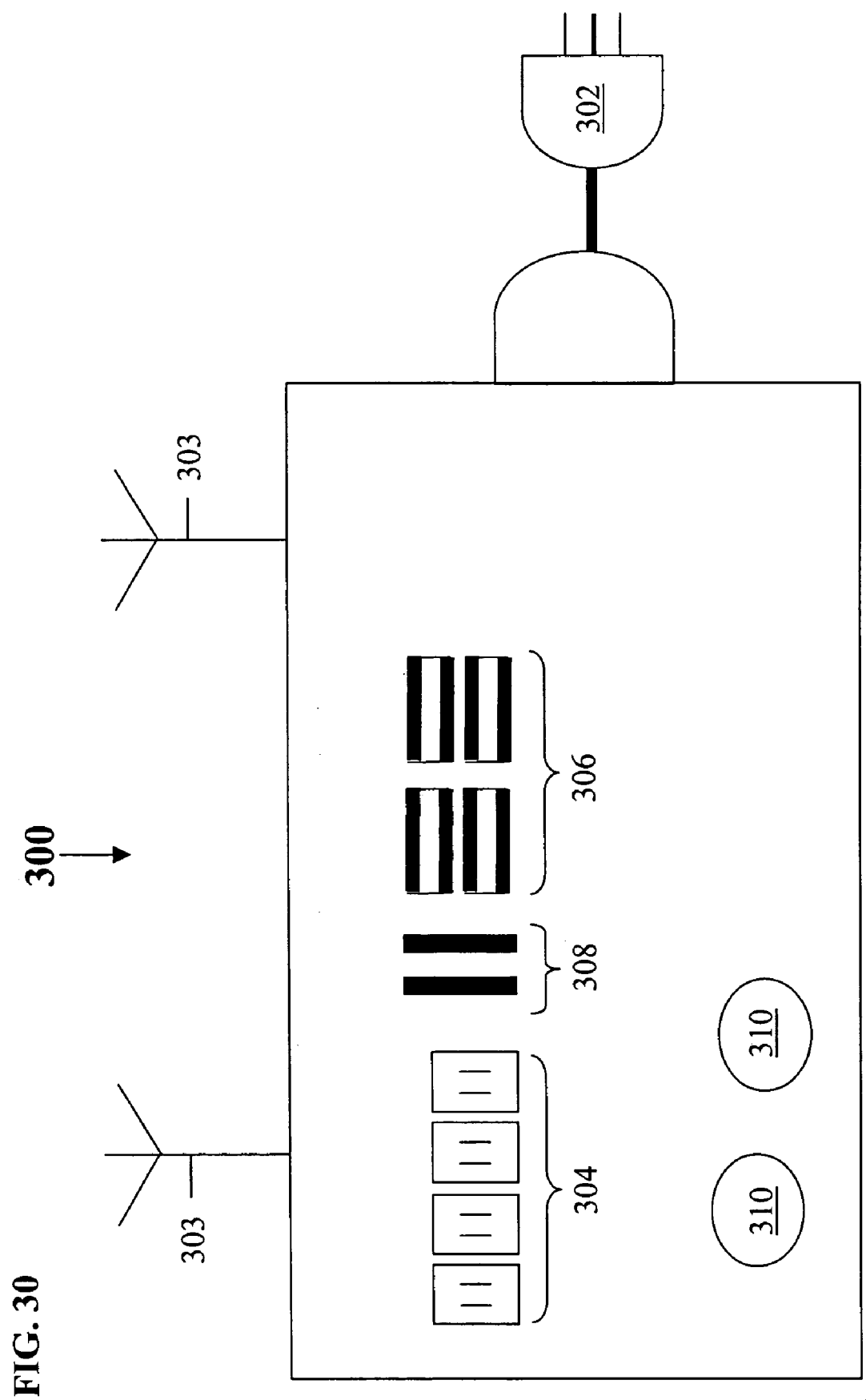
FIG. 30 is an illustration of an ultra-wideband communication gateway constructed according to one embodiment of the present invention.

FIG. 30 illustrates one embodiment of a gateway or bridge 300 constructed according to the present invention. In this embodiment the gateway 300 has a number of different communication media interfaces. These interfaces can include, but are not limited to, coaxial cable 310, power plug, or power line 304, IEEE-1394 (not shown), twisted pair wire, such as phone lines 306, CAT 5 Ethernet 308, wireless interfaces, such as antennas 303, S-Video cable interfaces (not shown), Universal Serial Bus interfaces (not shown), fiber optic cable (not shown), and any other type of communication media interfaces. Various embodiments of the gateway or bridge 300 may include some, or all of the components, features and functionality described above in connection with FIGS. 4–29. In the illustrated embodiment, the gateway 300 includes 201 a cable, or connector 302 that obtains electrical power from an electrical power outlet, or alternatively, the gateway 300 may be wired directly to an electrical power source.

One feature of the present invention is that it may perform the physical interface, logic and routing functions of bridging, or transferring ultra-wideband (UWB), and non-UWB formatted data between dissimilar media types (wire and wireless). As mentioned above, the present invention provides a system, methods, and apparatus that can communicate between, or "bridge" between different communications technologies.

In one embodiment, the gateway 300 may translate, or convert data that it receives to a common data format that is independent of the type of physical interface, or communication media that was used to transport it to the gateway 300. This common data format would include, or preserve the received data, and the routing, or destination information and the Quality of Service (QoS) information as well (QoS parameters may be expressed in bit-error-rate (BER) requirements). In addition, the common data format may also include, or preserve any priority requirements and any latency information.

The gateway 300 may then prepare, and transmit the data using the most appropriate communication media (wire or wireless). In this fashion, the common data format, in conjunction with associated hardware, functions as a "bridge" between different communication media.

For example, a television viewer in a residence may request a movie from a DVD player, that is in another room of the residence. The request may travel from the TV set-top-box to the gateway 300, that generates a UWB datastream, which is transmitted on the home's power line. The gateway 300 may send a request to the DVD player through the power line. The DVD player may then send the video stream to the gateway 300 via a UWB datastream modulated on a S-Video interface. The gateway 300 may then route the return DVD data via a UWB wireless link back to the TV's set-top-box. All these routing decisions are intelligently made and executed by the gateway 300 without user intervention.

Referring to FIGS. 31–33, the gateway 300 may employ a variety of remote devices to achieve additional range and/or functionality. FIG. 31 depicts one embodiment of a power line transceiver 401, FIG. 32 depicts one embodiment of a coaxial cable transceiver 316, and FIG. 33 depicts one embodiment of a CAT 5 or phone line transceiver 328. These transceivers may extend the range of a transmitted signal, and each transceiver may be addressable from the gateway 300. For example, the gateway 300 may send a wireless signal to a room, where one of the above transceivers 401, 316, 328 receives and retransmits the signal. One feature of this embodiment of the present invention is that it allows the gateway 300 to communicate over extended ranges. In one embodiment the transceivers may be directed to retransmit the signal on a different media. For example, the remote transceivers 401, 316, 328 may have both wired media and wireless media transceivers.

Specifically, as shown in FIG. 31, the power line transceiver 401 includes may be employed in any room, or other area of a structure that has electrical power outlets (not shown). The plug-in transceiver 401 is removably coupled to the electrical power outlet by male connectors 407. The male connectors 407 may be electrically conductive pins or plugs, and they may be sized and configured to fit female power outlets of any configuration. For example, the male connectors 407 may be sized to fit a 110 volt, 3-slot power female outlet; a 110 volt, 2-slot female power outlet; a 220 volt, 240 volt or greater voltage female power outlet that may be configured for Europe, Japan, or any other country. The female slots 402 may be sized and configured to receive any arrangement of male pins or plugs.

As shown in FIG. 31, the power line transceiver 401 includes an ultra-wideband (UWB) wire media transceiver 405. The power line transceiver 401 may also include a wireless transceiver 403 that has an ultra-wideband antenna 404. Alternatively, the power line transceiver 401 may have a single transceiver (not shown) that includes an ultra-wideband antenna 404, with the single transceiver constructed to transmit and receive both wired and wireless UWB pulses, or signals.

Thus, the power line transceiver 401 may communicate with the gateway 300 through the structure's power lines, or wirelessly. The power line transceiver 401 may function as a relay, by forwarding wireless UWB pulses, or signals through the power line to a UWB enabled device that is coupled to the power line transceiver 401.

Referring to FIG. 32, the coaxial transceiver 316 may also function as a data relay. The coaxial transceiver 316 includes a female coaxial (coax) connector 318, a male coax connector 320, a wireless transceiver 322 and a wire transceiver 324. The coaxial transceiver 316 may receive either ultra-wideband data wirelessly or through the coaxial cable. In addition, the coaxial transceiver 316 may receive data that is formatted using conventional, narrowband protocols through the coax cable, and subsequently transmit the data using ultra-wideband technology (UWB), as described herein. Alternatively, the coaxial transceiver 316 may receive UWB-formatted data from the gateway 300, and re-transmit the data, either wirelessly, or through the coaxial cable.

Similarly, as shown in FIG. 33, the phone line, or CAT 5 transceiver 328 may also function as a data relay. The CAT 5 transceiver 328 includes a female connector 330, a male connector 332, a wireless transceiver 334 and a wire transceiver 336. The CAT 5 transceiver 328 may receive either ultra-wideband data wirelessly or through the CAT 5 cable. In addition, the CAT 5 transceiver 328 may receive data that is formatted using conventional, narrowband protocols through the CAT 5 cable, and subsequently transmit the data using ultra-wideband technology (UWB), as described herein. Alternatively, the CAT 5 transceiver 328 may receive UWB-formatted data from the gateway 300, and re-transmit the data, either wirelessly, or through the coaxial cable. It will be appreciated that other types of connectors may be employed in this embodiment. For example, CAT 7, CAT 4, CAT 3, CAT 2, CAT 1, and other types of wire connectors may be employed.

In one envisioned method of operation, the gateway 300 receives and segments a communication signal, that may be either a conventional, narrowband signal or an UWB signal. Functions performed by the gateway 300 include receiving, transmitting, I/O control, routing, addressing, modulation, demodulation, load balancing, appropriate UWB pulse width and envelope shape determination for the media, appropriate pulse recurrence frequency, or pulse transmission rate determination, buffering and reformatting incoming data for reception and transmission into other conductive media capable of supporting UWB transmissions. It is anticipated that the received data may or may not include UWB formatted data.

The signal is demodulated, and the data, destination and source addresses are preserved. In addition, the priority, latency and Quality Of Service (QOS) requirements are preserved, and the type of data is identified (voice, video, ect.). Additionally, the gateway 300 may perform error detection and correction prior to reassembly and retransmission of the data. Using the above information, the gateway 300 decides which media type to employ for re-transmission (wire, or wireless). The gateway 300 then assembles a suitable frame structure, re-modulates the data and retransmits the data on the selected media. One feature of this embodiment is that it allows for a guaranteed QoS level by checking the integrity of data frames or packets prior to retransmission.

In another embodiment, the gateway 300 allocates bandwidth resources to provide maximum data rates to each of the interfaced media without the use of a discovery protocol for devices on the media. In another embodiment of the present invention, a gateway 300 provides for load balancing of outgoing data. In this embodiment, the gateway 300 may require a discovery protocol for identification of device requirements on each interfaced media. In this embodiment, a more intelligent load balancing may be employed. By tracking the requirements of each device, the gateway 300 is able to route communications to under-utilized media.

Communication between the gateway 300 and any of the transceivers 401, 316 328, or to other devices may be accomplished over one or more of the following: power lines, phone lines, wirelessly, coaxial cable and installed twisted-pair wires. The preferred embodiment has additional interfaces to support Ethernet, Giga-bit Ethernet, IEEE 1394 and USB. This embodiment intelligently bridges UWB communications to and from all wired and wireless interfaced media. For example, a coaxial cable that is connected to the gateway 300 may have a UWB datastream coexisting with other frequency modulated data. The gateway 300 detects and extracts the encoded UWB data from the coax cable, and determines the destination and optimal routing of the data. For example, the data enters the home on coax, but may routed from the gateway 300 via a UWB wireless link. The gateway 300 may be employed in any structure where a need for communication exists, such as, a home, business, university building, hospital or any other structure.

Thus, it is seen that a system and method for bridging data between different communication technologies and media is provided. One skilled in the art will appreciate that the present invention can be practiced by other than the above-described embodiments, which are presented in this description for purposes of illustration and not of limitation. The description and examples set forth in this specification and associated drawings only set forth preferred embodiment(s) of the present invention. The specification and drawings are not intended to limit the exclusionary scope of this patent document. Many designs other than the above-described embodiments will fall within the literal and/or legal scope of the instant disclosure, and the present invention is limited only by the instant disclosure. It is noted that various equivalents for the particular embodiments discussed in this description may practice the invention as well.

What is claimed is:

1. A communication system comprising:
  a receiver structured to receive a substantially continuous sine wave carrier signal, the signal modulated to contain communication data;
  a demodulator communicating with the receiver, the demodulator structured to demodulate the communication data from the substantially continuous sine wave carrier signal; and
  an ultra wide band transmitter coupled to the demodulator, the transmitter including an electromagnetic pulse generating circuit, with the electromagnetic pulse generating circuit structured to transmit a plurality of electromagnetic pulses, with the pulses configured to include the communication data, wherein the electromagnetic pulse generating circuit comprises:
  a control unit;
  at least two current sources;
  at least two switching elements connected to the current sources, each of the switching elements structured to receive a signal from the control unit;
  a switch connected to the at least two switching elements, the switch structured to receive a signal from the control unit;
  a load connected to the switch; and
  a first set of resistive elements connected to the current sources, and to the switching elements, the resistive elements also connected to a second voltage level.

2. A communication system comprising:

a receiver structured to receive a substantially continuous sine wave carrier signal, the signal modulated to contain communication data;

a demodulator communicating with the receiver, the demodulator structured to demodulate the communication data from the substantially continuous sine wave carrier signal; and an ultra wide band transmitter coupled to the demodulator, the transmitter including an electromagnetic pulse generating circuit, with the electromagnetic pulse generating circuit structured to transmit a plurality of electromagnetic pulses, with the pulses configured to include the communication data, wherein the electromagnetic pulse generating circuit comprises:

a control unit;

at least two current sources;

at least two switching elements connected to the current sources, each of the switching elements structured to receive a signal from the control unit;

a switch connected to the at least two switching elements, the switch structured to receive a signal from the control unit;

a load connected to the switch;

a first set of resistive elements connected to the current sources, and to the switching elements, the first set of resistive elements also connected to a second voltage level; and a second set of resistive elements connected to the switching elements, and to the switch, the second set of resistive elements also connected to the second voltage level.

* * * * *